United States Patent
Machida et al.

(10) Patent No.: US 6,592,491 B1
(45) Date of Patent: Jul. 15, 2003

(54) TOROIDAL TYPE CONTINUOUSLY VARIABLE TRANSMISSION

(75) Inventors: Hisashi Machida, Fujisawa (JP); Kouji Ishikawa, Fujisawa (JP); Takashi Imanishi, Yokohama (JP); Hiroyuki Itoh, Fujisawa (JP); Tomofumi Yamashita, Hiratsuka (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/395,216

(22) Filed: Sep. 14, 1999

(30) Foreign Application Priority Data

Apr. 7, 1999 (JP) .......................................... 11-099513
May 10, 1999 (JP) .......................................... 11-129097

(51) Int. Cl.[7] ............................................. F16H 15/38
(52) U.S. Cl. ............................. 476/40; 476/42; 476/46
(58) Field of Search ........................... 476/41, 42, 44, 476/46, 40, 10

(56) References Cited

U.S. PATENT DOCUMENTS

| | | | | |
|---|---|---|---|---|
| 3,345,882 A | * | 10/1967 | Armstrong | 476/10 |
| 5,033,322 A | | 7/1991 | Nakano | |
| 5,067,360 A | | 11/1991 | Nakano | |
| 5,334,097 A | * | 8/1994 | Tatara et al. | 476/40 |
| 5,395,292 A | * | 3/1995 | Fellows et al. | 476/10 |

FOREIGN PATENT DOCUMENTS

| | | |
|---|---|---|
| DE | 197 05 521 | 8/1997 |
| DE | 197 54 725 | 6/1999 |
| EP | 09 05 412 | 3/1999 |
| JP | 62-71465 | 5/1987 |
| JP | 62-200852 | 12/1987 |
| JP | 63-67458 | 3/1988 |
| JP | 63-203956 | 8/1988 |
| JP | 4-327051 | 11/1992 |
| JP | 4-52512 | 12/1992 |
| JP | 6-117515 | 4/1994 |
| JP | 6-185590 | * 7/1994 |
| JP | 6-280956 | 10/1994 |
| JP | 7-243496 | 9/1995 |
| JP | 8-23386 | 3/1996 |
| JP | 10-274300 | 10/1998 |
| JP | 11-118008 | 4/1999 |

* cited by examiner

Primary Examiner—William C Joyce
(74) Attorney, Agent, or Firm—Miles & Stockbridge P.C.

(57) ABSTRACT

In a toroidal type continuously variable transmission, first pivot shafts provided on both ends of first trunnions are supported within support holes formed in yokes secured to an inner surface of a casing. The support portions are provided with ball splines and radial needle bearings. During operation, loads acting on the first trunnions are cancelled within the yokes. Axial displacements and rocking displacements of the first trunnions are effected smoothly by the ball splines and the radial needle bearings.

10 Claims, 26 Drawing Sheets

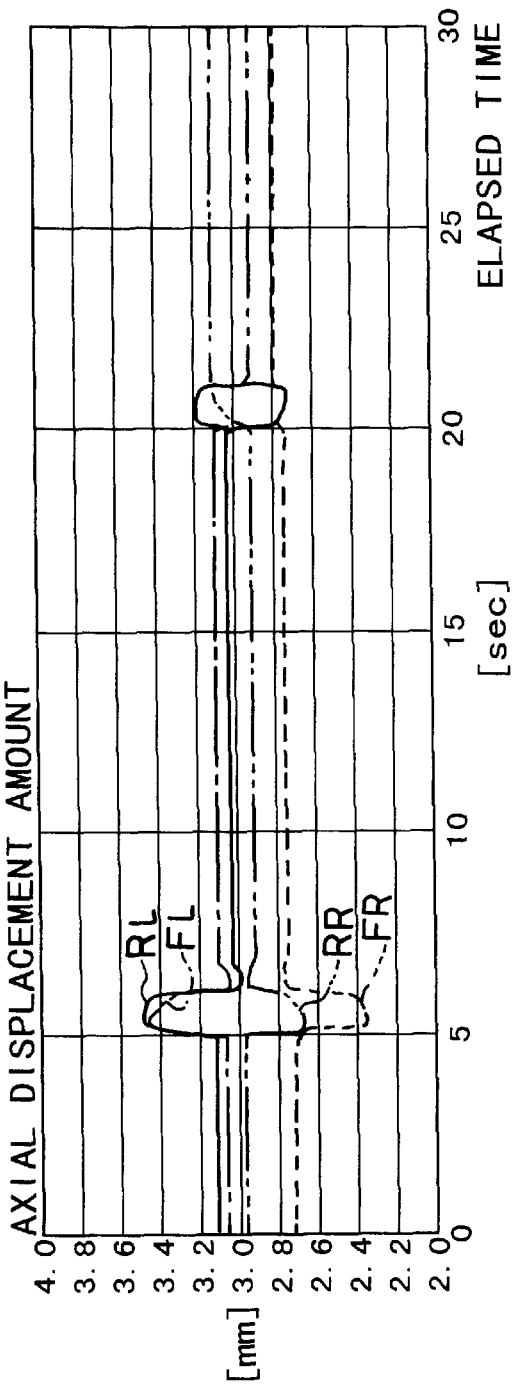
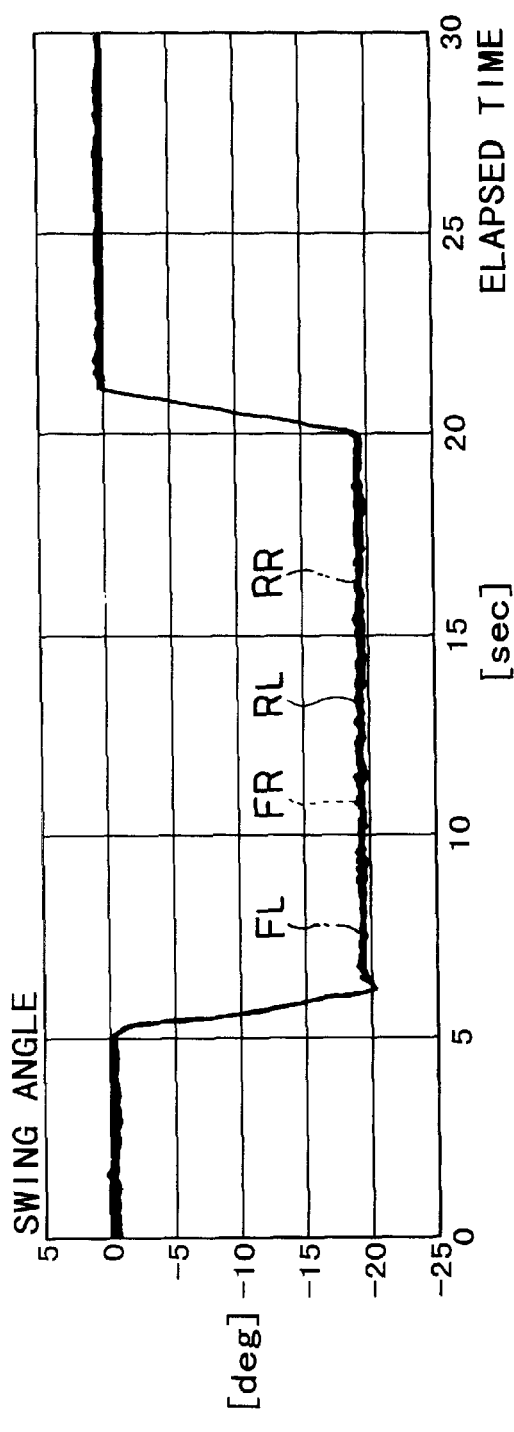
FIG. 22A
FIG. 22B

TOROIDAL TYPE CONTINUOUSLY VARIABLE TRANSMISSION

BACKGROUND OF THE INVENTION

1. Field of the Invention

A toroidal type continuously variable transmission according to the present invention is used, for example, as a speed change unit of a transmission of a motor vehicle or transmissions of various industrial machines, respectively.

2. Related Background Art

It has been investigated that a toroidal type continuously variable transmission schematically shown in FIGS. 24 and 25 is used as a transmission of a motor vehicle. For example, as disclosed in Japanese Utility Model Laid-Open No. 62-71465 (1987), in such a toroidal type continuously variable transmission, an input disc 2 is supported in coaxial with an input shaft 1 and an output disc 4 is secured to an end of an output shaft 3 disposed in coaxial with the input shaft 1. Within a casing (described later in connection with FIGS. 26 to 28) containing the toroidal type continuously variable transmission, there are provided trunnions 7 rockable around pivot shafts 6.located at positions twisted with respect to the input shaft 1 and the output shaft 3.

That is to say, each trunnion 7 is provided at its both end outer surfaces with the pivot shafts 6 in coaxial with each other. Accordingly, the pivot shafts 6 do not intersect with center lines of the discs 2, 4 but extend in perpendicular to such center lines. Further, central portions of the trunnions 7 support proximal ends of displacement shafts 8 so that inclination angles of the displacement shafts 8 can be adjusted by rocking or swinging the trunnions 7 around the pivot shafts 6. Power rollers 9 are rotatably supported around the displacement shafts 8 supported by the trunnions 7. The power rollers 9 are interposed between the input disc 2 and the output disc 4. Inner surfaces 2a, 4a of the discs 2, 4 which are opposed to each other have concave surfaces obtained by rotating arcs having centers on the pivot shaft 6 around the input shaft 1 and the output shaft 3. Peripheral surfaces 9a of the power rollers 9 having spherical convex shapes abut against the inner surfaces 2a, 4a. A pressing device 10 of loading cam type is disposed between the input disc 2 and the output disc 4 so that the input disc 2 is can be urged elastically toward the output disc 4 by the pressing device 10. The pressing device 10 comprises a cam plate 11 rotated together with the input shaft 1, and a plurality (for example, four) of rollers 13 held by a holder 12. One side surface (left side surface in FIGS. 24 and 25) of the cam plate 11 is constituted as a cam surface 14 having unevenness or undulation extending along a circumferential direction, and an outer surface (right side surface in FIGS. 24 and 25) of the input disc 2 has a similar cam surface 15. The plurality of rollers 13 are rotatably supported for rotation around axes extending radially with respect to the center line of the input shaft 1.

In use of the toroidal type continuously variable transmission having the above-mentioned construction, when the cam plate 11 is rotated as the input shaft 1 is rotated, the plurality of rollers 13 are urged against the cam surface 15 formed on the outer surface of the input disc 2 by the cam surface 14. As a result, the input disc 2 is urged against the plurality of power rollers 9, and, at the same time, due to the frictional engagement between the pair of cam surfaces 14, 15 and the plurality of rollers 13, the input disc 2 is rotated. Rotation of the input disc 2 is transmitted to the output disc 4 through the plurality of power rollers 9, thereby rotating the output shaft 3 secured to the output disc 4.

In a case where a rotational speed ratio (speed change ratio) between the input shaft 1 and the output shaft 3, when deceleration is effected between the input shaft 1 and the output shaft 3, the trunnions 7 are rocked or swung around the pivot shafts 6 in predetermined directions, thereby including the displacement shafts 8 so that the peripheral surfaces 9a of the power rollers 9 abut against a portion of the inner surface 2a of the input disc 2 near the center and a portion of the inner surface 4a of the output disc 4 near its outer periphery, respectively, as shown in FIG. 24. On the other hand, when acceleration is effected, the trunnions 7 are rocked around the pivot shafts 6 in opposite directions, thereby inclining the displacement shafts 8 so that the peripheral surfaces 9a of the power rollers 9 abut against a portion of the inner surface 2a of the input disc 2 near its outer periphery and a portion of the inner surface 4a of the output disc 4 near the center, respectively, as shown in FIG. 25. If the inclination angles of the displacement shafts 8 are selected to an intermediate value between FIG. 24 and FIG. 25, an intermediate speed change ratio can be obtained.

When the actual transmission of the motor vehicle is constituted by the above-mentioned the toroidal type continuously variable transmission, it is well known in the art to provide a so-called toroidal type continuously variable transmission of double cavity type in which two sets of input disc 2, output disc 4 and power rollers 9 are prepared, and such two sets of input disc 2, output disc 4 and power rollers 9 are arranged in parallel to each other along a power transmitting direction. FIGS. 26 and 27 show an example of such a toroidal type continuously variable transmission of double cavity type disclosed in Japanese Patent Publication No. 8-23386 (1996).

An input shaft 1a is supported within a casing 5 for only rotation. A cylindrical transmission shaft 16 is rotatably supported around the input shaft 1a in coaxial with the latter for rotation relative to the input shaft 1a. First and second input discs 17, 18 corresponding to first and second outer discs of the present invention are supported on both ends of the transmission shaft 16 via ball splines 19 so that inner faces 2a of these discs are opposed to each other. Accordingly, the first and second input discs 17, 18 are rotatably supported within the casing 5 in coaxial with and in synchronous with each other.

Further, first and second output discs 20, 21 corresponding to first and second inner discs of the present invention are supported around an intermediate portion of the transmission shaft 16 via a sleeve 22. An output gear 23 is integrally formed on an outer peripheral surface of an intermediate portion of the sleeve 22, and the sleeve has an inner diameter greater than an outer diameter of the transmission shaft 16. The sleeve is rotatably supported by a support wall 24 provided within the casing 5 via a pair of bearings 25 in such a manner than the sleeve is disposed in coaxial with the transmission shaft 16 and can merely be rotated. In this way, the first and second output discs 20, 21 are spline-connected to both end of the sleeve 22 rotatably mounted around the intermediate portion of the transmission shaft 16 in a condition that inner surfaces 4a of the discs 20, 21 are directed toward opposite directions. Accordingly, the first and second output discs 20, 21 are supported in coaxial with the first and second input discs 17, 18 and are rotated independently from the first and second input discs 17, 18 in a condition that the inner surfaces 4a are opposed to the respective inner surfaces 2a of the first and second input discs 17, 18.

Further, two pair of yokes 26a, 26b are supported by an inner wall of the casing 5 at both sides of the first and second output discs 20, 21 with the interposition of these output discs 20, 21. The yokes 26a, 26b correspond to yokes constituting first and second supporting means of the present invention and are formed as rectangular frames, respectively, by press-working a metal plate such as a steel or forging metal material such as steel. The yokes 26a, 26b are provided at their four corners with circular support holes 31 for rockably supporting first and second pivot shafts 29, 30 provided on both ends of first and second trunnions 27, 28 (described later) and are also provided with circular locking holes 32 formed in central portions of the yokes in a width-wise direction (left-and-right direction in FIGS. 27 and 28) thereof at both ends of the transmission shaft 16 in an axial direction (left-and-right direction in FIG. 26) thereof. The pairs of yokes 26a, 26b each having the above-mentioned configuration are supported by support ports 33a, 33b formed on opposed portions of the inner wall of the casing 5 for slight displacement. The support posts 33a, 33b are opposed to each other and are disposed within a first cavity 34 between the inner surface 2a of the first input disc 17 and the inner surface 4a of the first output disc 20 and a second cavity 35 between the inner surface 2a of the second input disc 18 and the inner surface 4a of the second output disc 21. Accordingly, in a condition that the yokes 26a, 26b are supported by the support posts 33a, 33b, one ends of the yokes 26a, 26b are opposed to an outer peripheral portion of the first cavity 34 and the other ends are opposed to an outer peripheral portion of the second cavity 35.

Further, a pair of first trunnions 27 are disposed within the first cavity 34 at diametrically opposed positions of the first input disc 17 and the first output disc 20, and a pair of second trunnions 28 are disposed within the second cavity 35 at diametrically opposed positions of the second input disc 18 and the second output disc 21. As shown in FIG. 27, the four (in total) first pivot shafts 29 which are coaxially provided on both ends of the trunnions 27 (two in each trunnion) are supported by one ends of the pair of yokes 26a, 26b for rocking movement and axial displacement. That is to say, the first pivot shafts 29 are supported within the support holes 31 formed in one ends of the yokes 26a, 26b via radial needle bearings 36. Each of the radial needle bearings 36 has an outer race 37 having a spherical convex outer peripheral surface and a cylindrical inner peripheral surface, and a plurality of needles 38. Accordingly, the first pivot shafts 29 are supported at both axial sides on one ends of the yokes 26a, 26b for reversible rocking movement and axial displacement. Further, as shown in FIG. 28, the four (in total) second pivot shafts 30 which are coaxially provided on both ends of the second trunnions 28 (pair in each trunnion) are supported within the second cavity 35 in the same manner as the first pivot shafts 29 provided on the first trunnions 27.

The first and second trunnions 27, 28 supported within the casing 5 for rocking movements and displacements in axial directions of first and second pivot shafts 29, 30 in this way are provided at their intermediate portions with circular holes 39, as shown in FIGS. 27 and 28. The first and second displacement shafts 40, 41 are supported in these circular holes 39. The first and second displacement shafts 40, 41 have support shaft portions 42 parallel with and eccentric with each other, and pivot shaft portions 43. The support shaft portions 42 are rotatably supported within the circular holes 39 via radial needle bearings 44. Further, first and second power rollers 45, 46 are rotatably supported around the pivot shaft portions 43 via other radial needle bearings 47.

Incidentally, the pair of first and second displacement shafts 40, 41 provided for each of the first and second cavities 34, 35 are disposed at opposite directions (diametrically opposed at 180 degrees) with respect to the input shaft 1a and the transmission shaft 16 for each of the first and second cavities 34, 35. Further, directions along which the pivot shaft portions 43 of the first and second displacement shafts 40, 41 are offset (eccentric) from the support shaft portions 42 are the same (up-and-down opposite directions in FIGS. 27 and 28) with respect to the rotational direction of the first and second input and output discs 17, 18, 20, 21. Further, the eccentric directions are substantially perpendicular to an installation direction of the input shaft 1a. Accordingly, the first and second power rollers 45, 46 are supported for slight displacement in the installation direction of the input shaft 1a and the transmission shaft 16 (slight axial displacement). As a result, if the first and second power rollers 45, 46 tend to be displaced in the axial direction of the input shaft 1a and the transmission shaft 16 (left-and-right direction in FIG. 26, and, direction perpendicular to the planes of FIGS. 27 and 28) by change in elastic deformation amount of constructural parts due to fluctuation in torque to be transmitted by the toroidal type continuously variable transmission, such displacement can be absorbed without acting any excessive stress on the constructural parts.

Further, between outer surfaces of the first and second power rollers 45, 46 and inner surfaces of intermediate portions of the first and second trunnions 27, 28, there are provided, in order from the outer surfaces of the first and second power rollers 45, 46, thrust ball bearings 48, and thrust bearings 49 such as sliding bearings or needle bearings. The thrust ball bearings 48 serve to support thrust load acting on the first and second power rollers 45, 46 and to allow rotations of the first and second power rollers 45, 46. Further, the thrust bearings 49 serve to support thrust loads acting on outer races 50 of the thrust ball bearings 48 and to allow the pivot shaft portions 43 and the outer races 50 to rock around the support shaft portions 42.

Further, drive rods 51 are connected to one ends (lower ends n FIGS. 27 and 28) of the first and second trunnions 27, 28, and drive pistons 52 are secured to outer surfaces of intermediate portions of the drive rods 51. The drive pistons 52 are slidably mounted within drive cylinders 53 in an oil-tight fashion. The drive pistons 52 and the drive cylinders 53 constitute actuators for displacing the first and second trunnions 27, 28 along the axial directions of the first and second pivot shafts 29, 30. Further, pressurized oil can be supplied within the drive cylinders 53 in response to switching of a control valve (not shown).

Further, an pressing device 10 of loading cam type is disposed between the input shaft 1a and the first input disc 17. The pressing device 10 includes a cam plate 11 spline-connected to the intermediate portion of the input shaft 1a so that it can be rotated together with the input shaft 1a but cannot be displaced in the axial direction, and a plurality of rollers 13 rotatably held by a holder 12. When the input shaft 1a is rotated, the pressing device serves to rotate the first input disc 17 while urging it toward the second input disc 18.

When the toroidal type continuously variable transmission having the above-mentioned construction is driven, the rotation of the input shaft 1a is transmitted to the first input disc 17 through the pressing device 10, so that the first and second input discs 17, 18 are rotated in synchronous with each other. The rotation of the first and second input discs 17, 18 is transmitted to the first and second output discs 20, 21 through the pairs of first and second power rollers 45, 46 disposed within the first and second cavities 34, 35. The rotation of the first and second output discs 20, 21 is picked-up by the output gear 23. When the rotational speed ratio between the input shaft 1a and the output gear 23 is changed, by switching the control valve, the pairs of drive pistons 52 corresponding to the first and second cavities 34, 35 are displaced in opposite directions by the same distance for the cavities 34, 35, respectively.

When the drive pistons 52 are displaced, two pairs (four in total) of trunnions 27, 28 are displaced in opposite directions, so that, for example, the first and second power rollers 45, 46 at the right in FIGS. 27 and 28 are shifted downwardly (FIGS. 27 and 28) and the first and second power rollers 45, 46 at the left in FIGS. 27 and 28 are shifted upwardly (FIGS. 27 and 28). As a result, directions of tangential forces acting on the contact areas between the peripheral surfaces 9a of the first and second power rollers 45, 46 and the inner surfaces 2a, 4a of the first and second input discs 17, 18 and the first and second output discs 20, 21 are changed. As the directions of forces are changed, the first and second trunnions 27, 28 are rocked in opposite directions around the first and second pivot shafts 29, 30 supported by the yokes 26a, 26b. As a result, as shown in FIGS. 24 and 25, the contact areas between the peripheral surfaces 9a of the first and second power rollers 45, 46 and the inner surfaces 2a, 4a of the discs 17, 18, 20, 21 are changed, thereby changing the rotational speed ratio between the input shaft 1a and the output gear 23.

By the way, in the conventional arrangement shown in FIGS. 26 to 28, the first and second trunnions 27, 28 are supported within the casing through the support posts 33a, 33b and the yokes 26a, 26b. Thus, since the number of parts is increased, not only manufacture, control and assembling of the parts become troublesome, but also height of the toroidal type continuously variable transmission in the up-and-down direction in FIGS. 26 to 28 is increased, so that it is hard to make the transmission compact and light-weighted. Further, if the transmission is forcibly made compact and light-weighted to permit installation of the transmission within a limited space, strength of parts is decreased, thereby worsening endurance.

Japanese Patent Laid-Open No. 10-274300 (1998) discloses an arrangement in which pivot shafts provided on both ends of trunnions constituting a toroidal type continuously variable transmission are supported by support members directly secured to an inner surface of a casing. With this arrangement, since the number of parts is decreased, the transmission can be made compact and light-weighted. However, in case of the toroidal type continuously variable transmission disclosed in this document, the support members for supporting the pivot shafts provided on both ends of the trunnions are independently provided for each trunnion.

Thus, in the arrangement disclosed in the above Japanese Patent Laid-Open No. 10-274300, loads acting on the trunnions when the toroidal type continuously variable transmission is driven directly act on the casing. That is to say, when the toroidal type continuously variable transmission is driven, since pressure acting on contact areas between inner surfaces of input and output discs and peripheral surfaces of power rollers is great, the power rollers are subjected to great thrust loads. Such thrust loads act on the support portions for the pivot shafts provided on both ends of the trunnions through the trunnions. In the arrangement disclosed in above-mentioned document, the great loads acting on the pivot shafts in this way act on the casing as they are. In many cases, since the casing of the transmission is made of light alloy such as aluminium alloy to reduce the weight, in order to prevent displacement of the pivot shafts and to ensure the endurance of the casing regardless of great loads, it is necessary to increase a wall thickness of the casing, with the result that it is hard to make the transmission compact and light-weighted.

Further, when the toroidal type continuously variable transmission is driven, due to the great loads acting on the trunnions from the power rollers, the trunnions are elastically deformed so that the inner surfaces thereof becomes concave. As a result, parallelism between central axes of the pivot shafts provided on the ends of the trunnions and central axes of circular holes formed in the support members secured to the inner surface of the casing is lost more or less. In the arrangement disclosed in above-mentioned document, it is not considered that the trunnions can be displaced smoothly without damaging any parts even if such a condition occurs.

SUMMARY OF THE INVENTION

In consideration of the above circumstances, a toroidal type continuously variable transmission according to the present invention is devised.

As is in conventional toroidal type continuously variable transmissions, a toroidal type continuously variable transmission according to the present invention comprises a casing, input and output discs supported within the casing in coaxial with each other and capable of being rotated independently, the even number of pivot shafts disposed in coaxial with or parallel with each other between the discs at twisted positions where the pivot shafts do not intersect with a central axis of the discs but extend toward directions perpendicular to the central axis, a plurality of trunnions rockable around the pivot shafts, displacement shafts protruded from inner surfaces of the trunnions, a plurality of power rollers rotatably supported around the displacement shafts and interposed between inner surfaces of the input and output discs, and support means provided at sides of the power roller and adapted to support the pivot shafts for rocking displacement and axial displacement.

Further, as is in conventional toroidal type continuously variable transmissions, a toroidal type continuously variable transmission according to the present invention comprises a casing, first and second outer discs supported within the casing in coaxial with each other and capable of being rotated synchronously so that inner surfaces of the discs are opposed to each other, a first inner disc supported in coaxial with the first and second outer discs and capable of being rotated independently from the first and second outer discs and having an inner surface opposed to the inner surface of the first outer disc, a second inner disc supported in coaxial with the first inner disc and capable of being rotated synchronously with the first inner disc and having an inner surface opposed to the inner surface of the second outer disc, four first pivot shafts disposed in coaxial with or parallel with each other between the first outer disc and the first inner disc at twisted positions where the pivot shafts do not intersect with a central axis of these discs but extend toward directions perpendicular to the central axis, a pair of first trunnions rockable around the first pivot shafts, first displacement shafts protruded from inner surfaces of the first trunnions, a pair of first power rollers rotatably supported around the first displacement shafts and interposed between the inner surface of the first outer disc and the inner surface of the first inner disc, four second pivot shafts disposed in coaxial with or parallel with each other between the second outer disc and the second inner disc at twisted positions where the pivot shafts do not intersect with a central axis of these discs but extend toward directions perpendicular to the central axis, a pair of second trunnions rockable around the second pivot shafts, second displacement shafts protruded from inner surfaces of the second trunnions, a pair of second power rollers rotatably supported around the second displacement shafts and interposed between the inner surface of the second outer disc and the inner surface of the second inner disc, and first and second support means provided substantially in parallel with each other at sides of the first and second inner discs with the interposition of the first and second inner discs in such a manner that one ends are disposed between the first outer disc and the first inner disc and the other ends are disposed between the second outer disc and the second inner disc; and the first support means supports two of the four first pivot shafts and two of the four second pivot shafts for rocking movement and axial displacement, and the second support means supports the other two of the four first pivot shafts and the other two of the four second pivot shafts for rocking movement and axial displacement.

Particularly, the toroidal type continuously variable transmission according to the present invention is characterized in that members constituting the support means or the first and second support means are directly supported by and secured to an inner surface of the casing.

According to the toroidal type continuously variable transmission of the present invention having the above-mentioned arrangements, a rotational force is transmitted between the input disc or the first and second outer discs and the output disc or the first and second inner discs, and, a speed change ratio between the input disc or the first and second outer discs and the output disc or the first and second inner discs can be changed in the same manner as the conventional toroidal type continuously variable transmissions.

Particularly, in the toroidal type continuously variable transmission of the present invention, since the members constituting the support means or the first and second support means are directly supported by and secured to the inner surface of the casing, the number of parts is reduced to facilitate manufacture, control and assembling of the parts, and a height of the toroidal type continuously variable transmission is decreased to make the transmission compact and light-weighted while ensuring the endurance.

In a toroidal type continuously variable transmission according to another aspect of the present invention, yokes having ends for supporting the pivot shafts provided on the ends of the plurality of trunnions forming a part of the support means are directly supported by and secured to the inner surface of the casing. Further, it is designed so that the pivot shafts can be displaced axially, by splines, with respect to the ends of the yokes, and needle bearings for rockably supporting the pivot shafts are provided within the inside of the splines.

In a toroidal type continuously variable transmission according to a further aspect of the present invention, yokes having four corners for supporting the pivot shafts provided on the ends of the plurality of trunnions forming a part of the first and second support means are directly supported by and secured to the inner surface of the casing. Further, it is designed so that the pivot shafts can be displaced axially, by splines, with respect to the four corners of the yokes, and needle bearings for rockably supporting the pivot shafts are provided within the inside of the splines.

In this way, in the toroidal type continuously variable transmission of the present invention, since the yokes constituting the support means or the first and second support means are directly supported by and secured to the inner surface of the casing, the number of parts is reduced to facilitate manufacture, control and assembling of the parts, and a height of the toroidal type continuously variable transmission is decreased to make the transmission compact and light-weighted while ensuring the endurance.

Furthermore, since the yokes support the pivot shafts provided on the ends of the plurality of trunnions, all or part of forces acting on the plurality of trunnions can be canceled in the yokes. Thus, since a great load does not act on the casing supporting the yokes, it is not required that the wall thickness of the casing be increased in order to prevent displacement of the support portions for the pivot shafts and reduction in endurance of the casing.

In addition, since the splines and the needle bearings are provided between the pivot shafts and the yokes, the displacement of the trunnions with respect to the yokes can be effected smoothly and correctly.

It may be designed so that the splines are ball splines, and outer peripheral surfaces of outer races formed in inner peripheral surfaces of ball spline grooves constituting the ball splines are formed as semi-spherical convex surfaces, and the convex surfaces are rockably receiving in circular holes formed in the yokes.

Incidentally, a gear transmitting mechanism may be provided between the plurality of trunnions to synchronize the inclination movements of the trunnions.

A toroidal type continuously variable transmission according to a further aspect of the present invention comprises a casing, input and output discs supported within the casing in coaxial with each other and capable of being rotated independently so that inner surfaces of the discs are opposed to each other, four or more and the even number of pivot shafts disposed in coaxial with or parallel with each other between the input disc and the output disc at twisted positions where the pivot shafts do not intersect with a central axis of the discs but extend toward directions perpendicular to the central axis, a plurality of trunnions rockable around the pivot shafts, displacement shafts protruded from inner surfaces of the trunnions, a plurality of power rollers rotatably supported around the displacement shafts and interposed between an inner surface of the input disc and an inner surface of the output disc, and a plurality of actuators having the same number as that of the trunnions and adapted to displace the trunnions along axial directions of the pivot shafts.

A toroidal type continuously variable transmission according to a still further aspect to the present invention comprises a casing, first and second outer discs supported within the casing in coaxial with each other and capable of being rotated synchronously so that inner surfaces of the discs are opposed to each other, a first inner disc supported in coaxial with the first and second outer discs and capable of being rotated independently from the first and second outer discs and having an inner surface opposed to the inner surface of the first outer disc, a second inner disc supported in coaxial with the first inner disc and capable of being rotated synchronously with the first inner disc and having an inner surface opposed to the inner surface of the second outer disc, four or more and the even number of first pivot shafts disposed in coaxial with or parallel with each other between the first outer disc and the first inner disc at twisted positions where the pivot shafts do not intersect with a central axis of these discs but extend toward directions perpendicular to the central axis, a plurality of first trunnions rockable around the first pivot shafts, first displacement shafts protruded from inner surfaces of the first trunnions, a plurality of first power rollers rotatably supported around the first displacement shafts and interposed between the inner surface of the first outer disc and the inner surface of the first inner disc, four or more and the even number of second pivot shafts disposed in coaxial with or parallel with each other between the second outer disc and the second inner disc at twisted positions where the pivot shafts do not intersect with a central axis of these discs but extend toward directions perpendicular to the central axis, a plurality of second trunnions rockable around the second pivot shafts, second displacement shafts protruded from inner surfaces of the second trunnions, a plurality of second power rollers rotatably supported around the second displacement shafts and interposed between the inner surface of the second outer disc and the inner surface of the second inner disc, and a plurality of actuators having the same number as that of the trunnions and adapted to displace the trunnions along axial directions of the pivot shafts.

Particularly, in the toroidal type continuously variable transmission of the present invention, there is provided a synchronizing mechanism for mechanically synchronizing the displacement movements of the trunnions along the axial directions of the pivot shafts effected by the actuators.

For example, such a synchronizing mechanism may comprise receiving pieces having proximal ends secured to the ends of the trunnions and secured to tip ends of drive rods capable of being displaced axially by the actuators to displace the trunnions along the axial directions of the pivot shafts, and rocking arms having ends engaged by the receiving pieces to be merely rocked and central portions pivotally supported by a second pivot shaft (fixed portion) arranged in parallel with a rotational center line of the discs.

As is in conventional toroidal type continuously variable transmissions, in the toroidal type continuously variable transmission of the present invention having the above-mentioned arrangement, the rotational force is transmitted between the input disc and the output disc or between the first and second outer discs and the first and second inner discs, and, further, by changing the inclination angles of the trunnions, the rotational speed ratio between the discs is changed.

Particularly, in the toroidal type continuously variable transmission of the present invention, since the displacement movements of the trunnions along the axial directions of the pivot shafts effected by the actuators are mechanically synchronized, even when a quick speed change operation is performed, the inclination angles of the trunnions can be coincided with each other exactly.

The other objects and features of the present invention will be apparent from the following detailed explanation of the invention referring to the accompanying drawings.

BRIEF DESCRIPTION OF THE DRAWINGS

FIGS. 22A and 22B are graphs showing displacement conditions of trunnions constituting the toroidal type continuously variable transmission of the present invention;

DESCRIPTION OF THE PREFERRED EMBODIMENTS

<First Embodiment>

Figure 26:
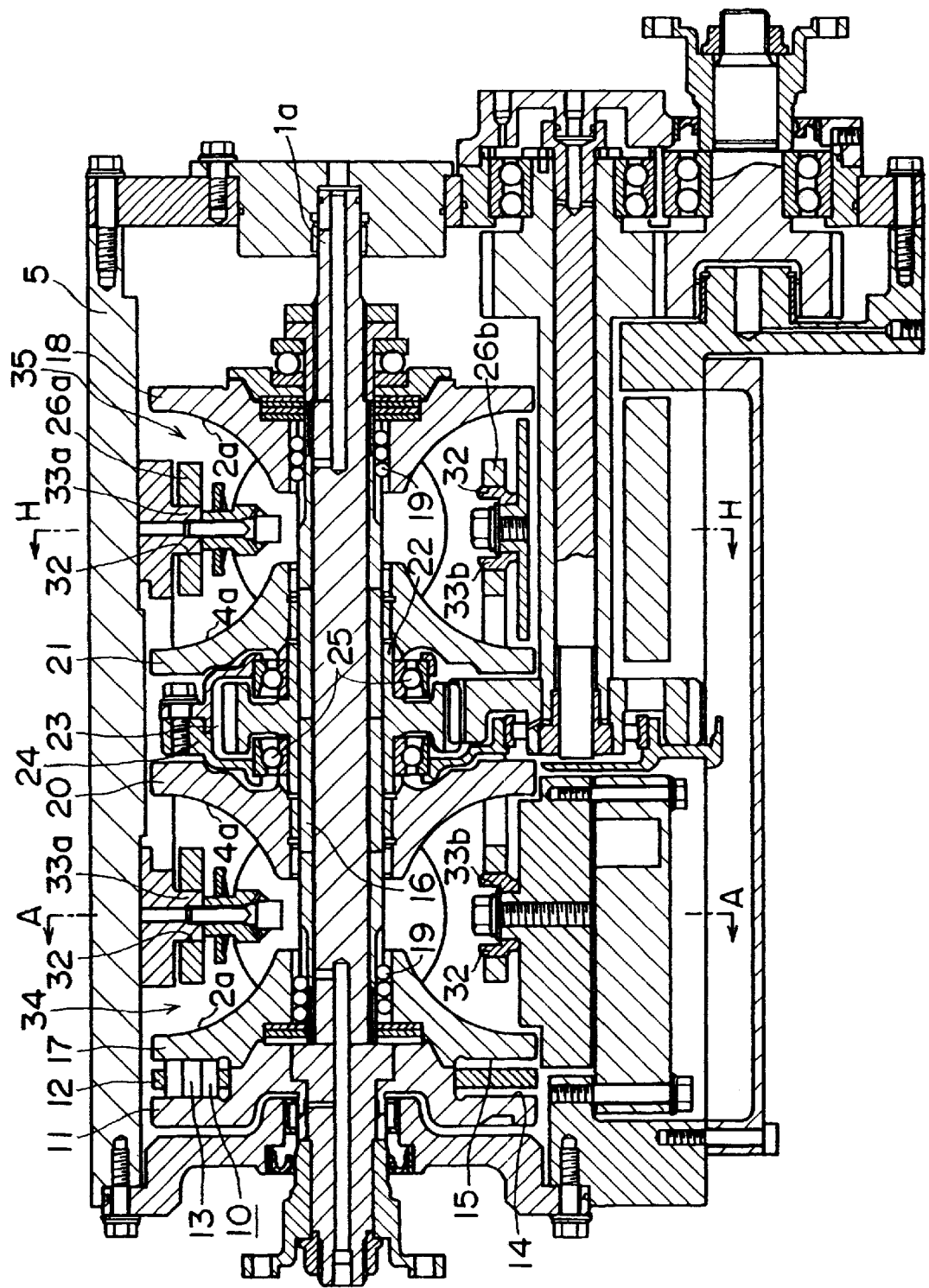
FIG. 26 is a sectional view showing an example of a conventional concrete construction.
Figure 27:
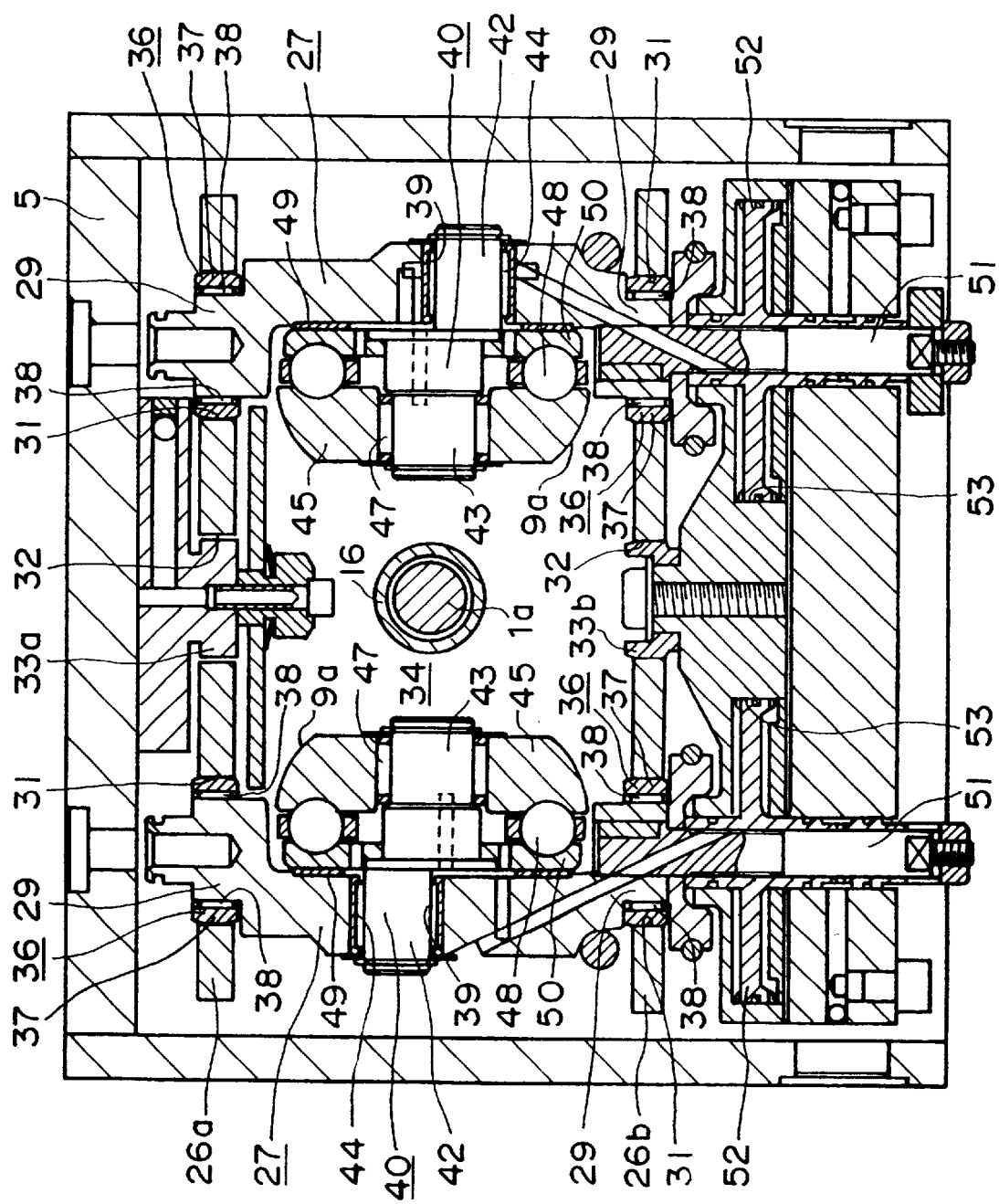
FIG. 27 is a sectional view taken along the line A—A in FIG. 26.
Figure 28:
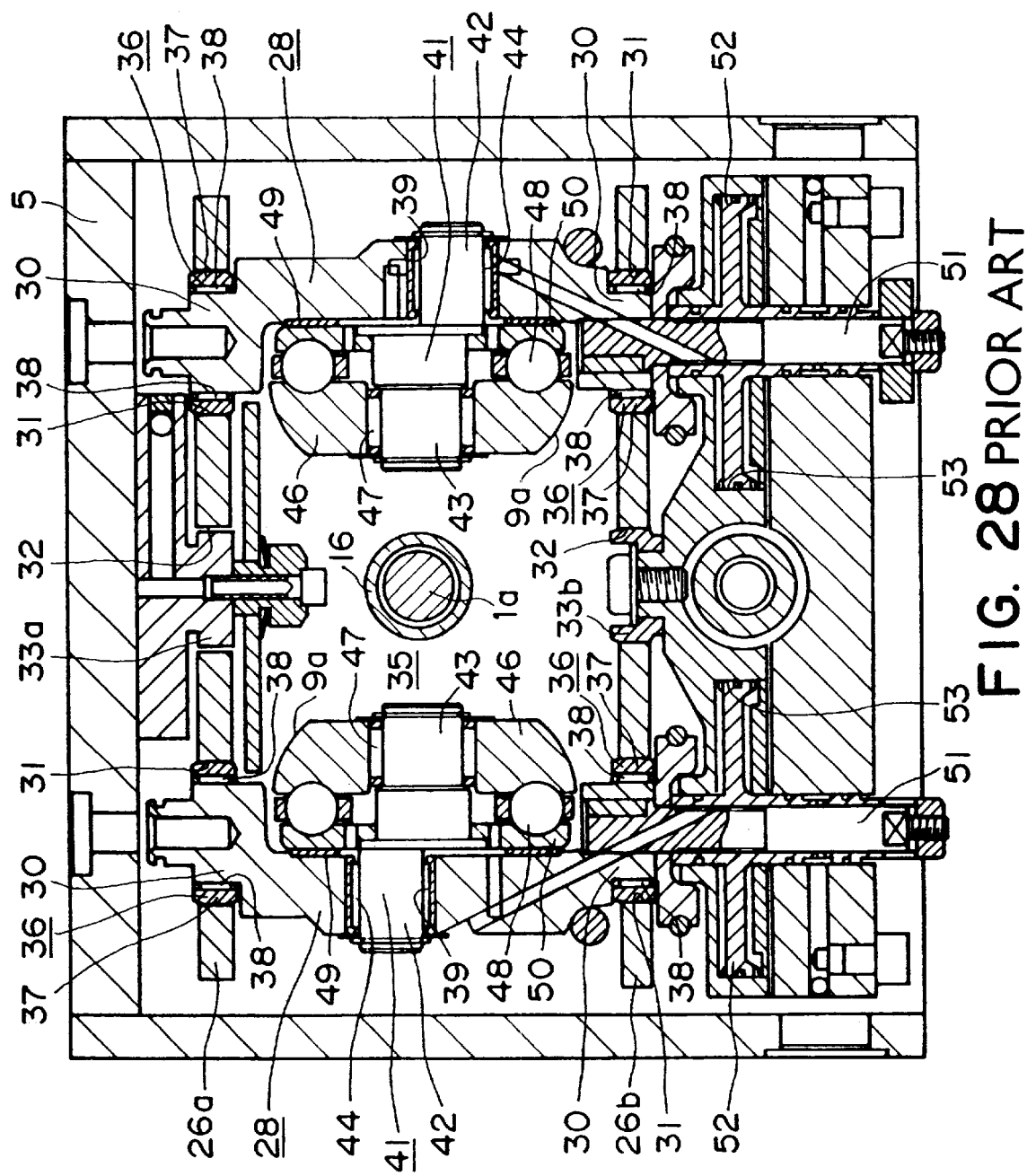
FIG. 28 is a sectional view taken along the Line H—H in FIG. 26.

FIGS. 1 to 7 show a first embodiment of the present invention. Incidentally, the characteristics of this embodiment include a construction of parts for supporting first pivot shafts 29 provided on both ends of first trunnions 27 with respect to a casing 5 and a construction for positively synchronizing inclination angles of the trunnions 27. Since the other constructions and functions are the same as those of the conventional technique shown in FIGS. 26 to 28, illustration and explanation thereof are omitted or briefly described, and the characteristics of this embodiment will be mainly explained. Further, second pivot shafts 30 (FIG. 28) provided on both ends of second trunnions 28 are also supported with respect to the casing 5 and inclination angles of the second trunnions 28 are positively synchronized by the same construction as the construction regarding the first pivot shafts 29. In the following explanation, as a rule, only the first trunnions 27 will be described, except for cases where the second trunnions 28 and associated parts must be explained.

A pair of yokes 54, 55 constituting first and second support means are disposed in parallel with each other and are directly secured to opposed portions of the casing 5. Incidentally, positioning accuracy of the yokes 54, 55 with respect to the casing 5 is exactly regulated by engagement between knock pins protruded from one of the yokes and casing and lock holes formed in the other of the yokes and casing. Circular support holes 31 are formed in four corners of the yokes 54, 55 at engagement positions. Among these support holes 31, within the support holes 31 formed in one ends of the yokes 54, 55, the first pivot shafts 29 are supported via ball splines 56 and radial needle bearings 57 for axial displacement and rocking movement.

Ball spline outer races 58 constituting the ball splines 56 are fitted into opened half sides of the support holes 31 in a condition that the outer races can slightly be rocked and axial displacement of the races is limited. To this end, the opened half sides of the support holes 31 are provided with small diameter portions 59 having front diameters smaller than rear diameters. The ball spline outer races 58 constituting the ball splines 56 are fitted into the smaller diameter portions 59. Outer peripheral surfaces of intermediate portions of the ball spline outer races 58 are formed as partial spherical convex surfaces 60. A radius of curvature of each convex surface 60 is substantially equal to a half (½) of an inner diameter of each support hole 31.

Further, outwardly directed circumferential flanges 61 are formed on outer peripheral surfaces at axial one ends of the ball spline outer races 58 and circumferential locking grooves 62 are formed in outer peripheral surfaces at the other axial ends of the ball spline outer races. Such ball spline outer races 58 are assembled in such a manner that the flanges 61 are positioned at rear sides of the support holes 31 and the smaller diameter portions 59 are sandwiched from both sides between the flanges 61 and stop rings 63 locked to the locking grooves 62. Incidentally, in this condition, a distance between each flange 61 and the corresponding stop ring 63 is selected to be greater than an axial length of the corresponding smaller diameter portion 59. Accordingly, the ball spline outer races 58 are supported within the support holes 31 for slight rocking movement.

Further, a plurality of outer race side ball spline grooves 64 extending in an axial direction (up-and-down direction in FIG. 1 and FIGS. 3 to 5) are formed in an inner races 65 (also acting as outer races of the radial needle bearings 57) are disposed within the interiors of the ball spline outer races 58 in coaxial with the radial needle bearings 57. Inner race side ball spline grooves 66 extending in an axial direction are formed in portions of the outer peripheral surfaces of the ball spline inner races 65 which are opposed to the outer race side ball spline grooves 64. A plurality of balls 67 are disposed between the respective inner race side ball spline grooves 66 and the respective outer race side ball spline grooves 64, thereby constituting the ball splines 56.

Cylindrical outer race tracks 68 for the radial needle bearings 57 are provided on inner peripheral surfaces of the ball spline inner races 65. A plurality of needles 70 are disposed between the respective outer race tracks 68 and respective cylindrical inner race tracks 69 formed on the outer peripheral surfaces of the first pivot shafts 29 provided on both ends of the first trunnions 27, thereby constituting the radial needle bearings 57.

Among the first pivot shafts 29 provided on both ends of the first trunnions 27, tip end portions of the first pivot shafts 29 connected to the drive rods 51 at one side (lower end side in FIGS. 1 and 3) have pinions 72 (constituting a gear transmitting mechanism 71 which will be described later) secured thereto. On the other hand, circular hold-down plate 73 are secured to tip ends of the first pivot shafts 29 at the other side (upper end side in FIGS. 1 and 3) remote from the drive rods 51, by threading threaded rods 74 provided on central portions of the hold-down plates into threaded holes 75 formed in the central portions of the first pivot shafts 29. Such pinions 72 and hold-down plates 73 serve to prevent axial shifting movement of the ball spline inner races 65 and dislodging of the alls 67. Incidentally, dislodging of the balls 67 in the opposite direction is prevented by stop rings 85 locked to the outer peripheral surfaces of proximal ends (ends near the axial central portions of the first trunnions 27) of the ball spline inner races 65.

Figure 1:
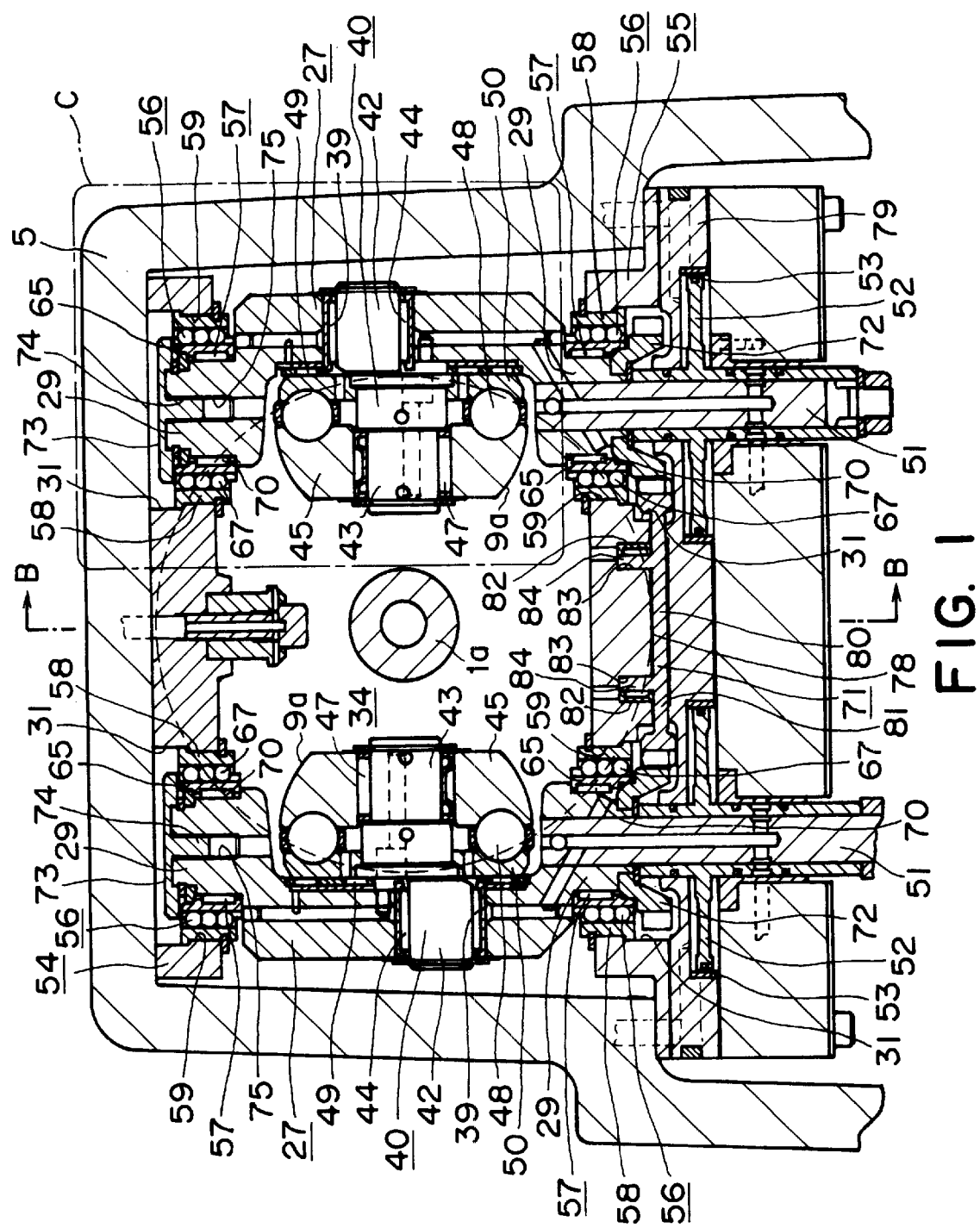
FIG. 1 is a sectional view corresponding to a sectional view taken along the line A—A in FIG. 26, showing a first embodiment of the present invention.
Figure 2:
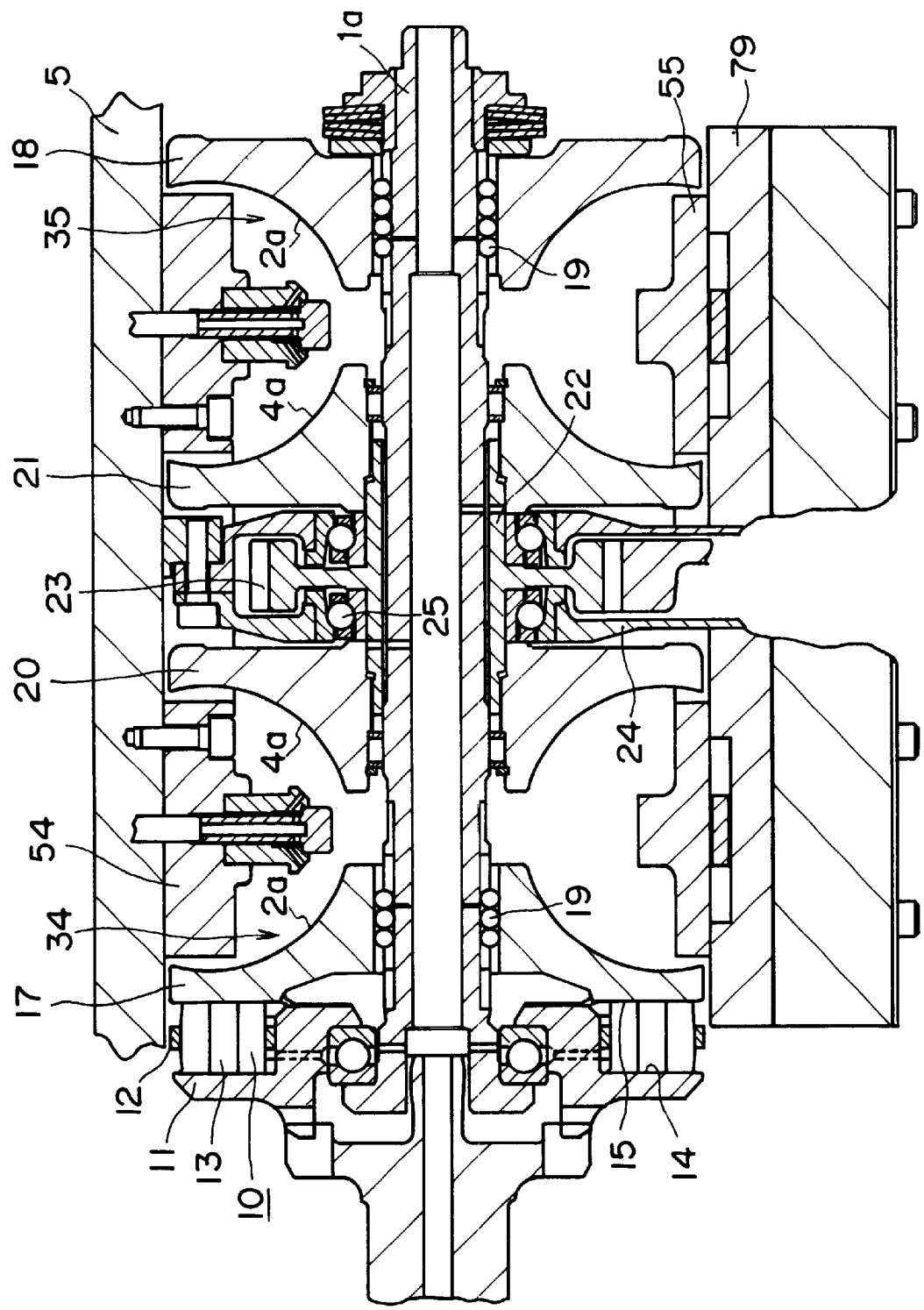
FIG. 2 is a sectional view taken along the line B—B in FIG. 1.
Figure 3:
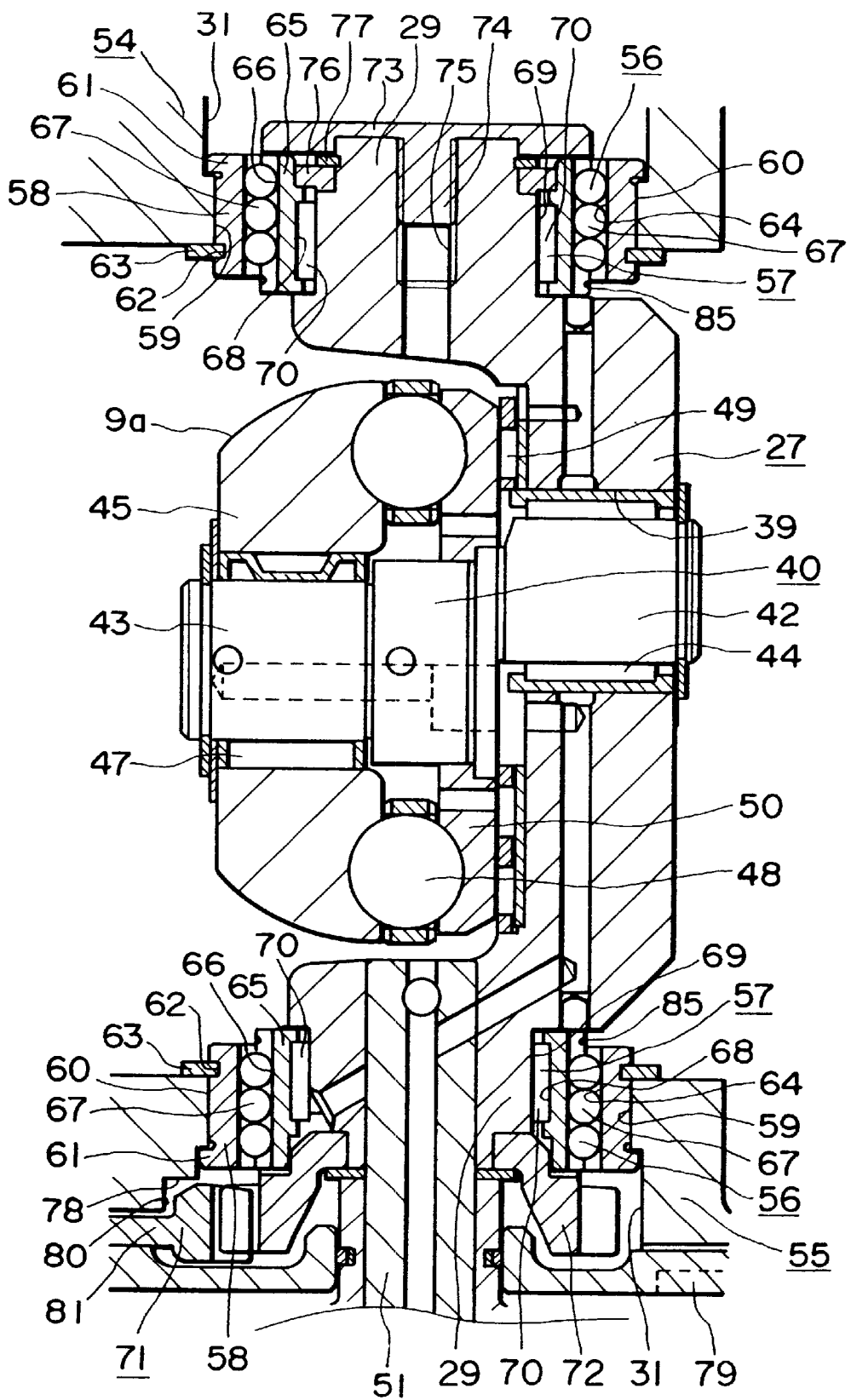
FIG. 3 is an enlarged sectional view showing a right portion of FIG. 1.
Figure 4:
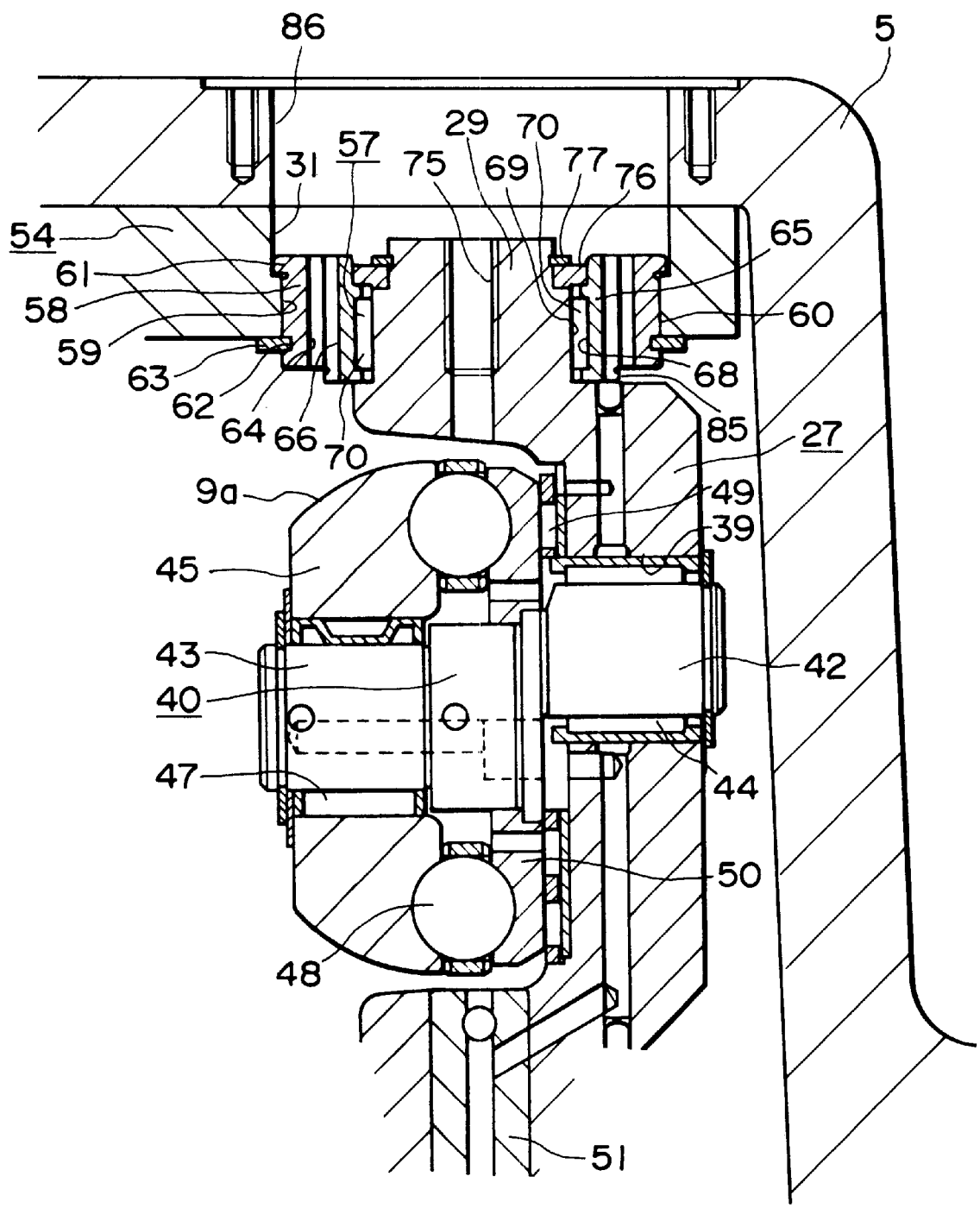
FIG. 4 is a view corresponding to a portion C in FIG. 1, showing a condition that assembling is being effected.
Figure 5:
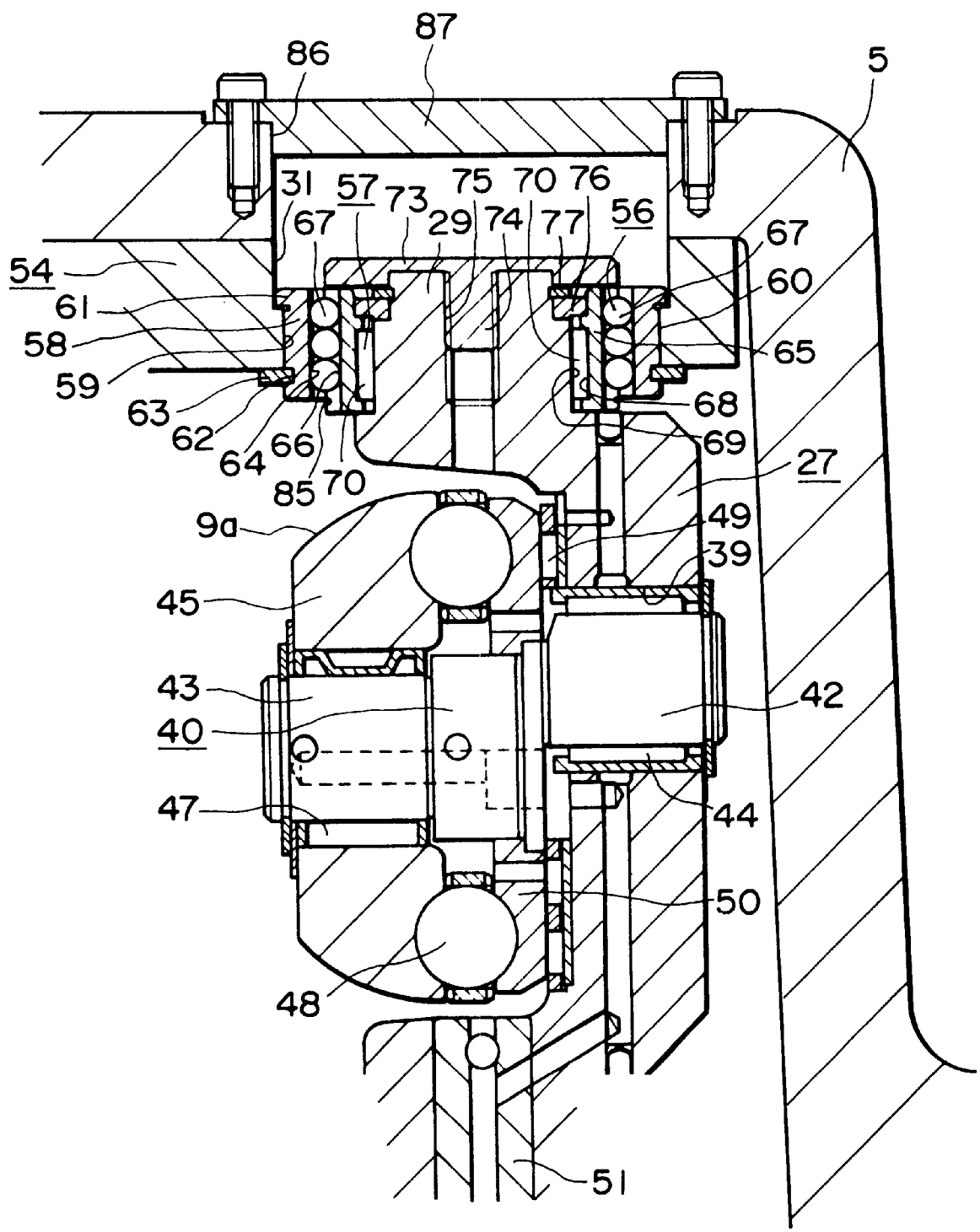
FIG. 5 is a view corresponding to a portion C in FIG. 1, showing a condition that the assembling is completed.

Incidentally, among the construction according to the illustrated embodiment, the ball spline 56 and the radial needle bearing 57 are assembled as follows. As shown in FIG. 4, the radial needle bearing 57 including the ball spline inner race 65 is previously mounted on the first pivot shaft 29 provided on the other end of the first trunnions 27 and is prevented from dislodging by means of a washer 76 and a stop ring 77. Further, as shown in FIG. 4, the ball spline outer race 58 is previously mounted within the support hole 31 formed in the yoke 54. In this condition, the plurality of balls 67 constituting the ball spline 56 are inserted between the respective inner race side ball spline grooves 66 formed in the outer peripheral surface of the ball spline inner race 65 and the respective outer race side ball spline grooves 64 formed in the inner peripheral surface of the ball spline outer race 58, through hole 86 formed in a portion of the casing 5 aligned with the support hole 31. After insertion, as shown in FIG. 5, the hold-down plate 73 is mounted, and then, the through hole 87 is closed by a lid plate 87.

By the way, in case of the toroidal type continuously variable transmission of the present invention including the arrangement according to the illustrated embodiment, since the yokes 54, 55 are not displaced, the yokes 54, 55 do not have functions for coinciding the inclination angles of the pair of opposed first power rollers 45 with each other. That is to say, although such inclination angles are adjusted by the axial displacement amounts of the drive rods 51 controlled by supplying or discharging the pressurized oil with respect to the drive cylinders 53, it is difficult to exactly coincide the inclination angles of the pair of first power rollers 45 with each other by such axial displacement amounts. Thus, in the conventional arrangements, the inclination angles of the pair of first power rollers 45 have been exactly coincided with each other by permitting the displacement of the yokes 26a and by supporting the first power rollers 45 in a so-called floating fashion. However, in the toroidal type continuously variable transmission of the present invention, the inclination angles of the pair of first power rollers 45 cannot be coincided with each other by the displacement of the yokes 54, 55.

Thus, in the illustrated embodiment, the pair of opposed first trunnions 27 are interconnected through the gear transmitting mechanism 71 so that the pair of first power rollers 45 supported by the first trunnions 27 can be coincided with each other exactly. To install the gear transmitting mechanism 71, one (lower one (55) in FIGS. 1 to 3) of the yokes is provided with a recessed portion 78. Accordingly, in a condition that the yoke 55 and a cylinder case 79 are overlapped with each other, a space 80 for containing the gear transmitting mechanism 71 is defined between these members 55, 79. The gear transmitting mechanism 71 contained in this space 80 includes a pair of pinions 72 having the same configuration and the same number of teeth, and a rack 81 having toothed portions provided on both end portions and having the same pitch. The pinions 72 are fitted onto the secured to non-cylindrical portions formed on the top ends of the first pivot shafts 29 provided on the ends of the first trunnions 27. Accordingly, the first trunnions 27 are rotated in synchronous with the pinions 72. Incidentally, when the speed change ratio is changed, the first trunnions 27 are displaced in the axial directions of the first pivot shafts 29. Accordingly, by providing moderate (an amount which does not arise any problem regarding the coincidence of the inclination angles) backlash in engagement areas between the pinions 72 and the rack 81, relative displacement between the pinions 72 and the rack 81 is permitted.

The rack 81 can be displaced only along the axial direction (direction perpendicular to the planes of FIGS. 1 and 3) of the input shaft 1a and is supported within the space 80. To this end, in the illustrated embodiment, the rack 81 is supported by translation rolling bearings (linear bearings) 82 for parallel shifting movement with respect to the yoke 55. That is to say, guide recessed portions 83 extending the displacing direction of the rack 81 are formed in a portion (opposed to the rack 81) of a lower surface of the yoke 55 secured to the inner surface of the casing 5.

Further, guide flanges 84 are formed on portions (aligned with the guide recessed portions 83) of an intermediate part of the rack 81. A thickness of each guide flange 84 is selected to be smaller than a width of each guide recessed portion 83 so that the guide flanges 84 are loosely inserted within the guide recessed portions 83. The rolling bearings 82 are disposed between the respective one surfaces of the flanges 84 and the respective inner surfaces of the guide recessed portions 83. Such rolling bearings 82 are disposed at positions where they sandwich the flanges 84 provided on the rack from both sides (or, contrary to illustration, positions where the flanges 84 sandwich the rolling bearings 82 from both sides).

Accordingly, the rack 81 can smoothly be displaced with respect to the yoke 55 with a light force without inclining toward the guide recessed portions 83. Further, if a force directing perpendicular to the displacing direction acts on the rack 81, any one of the pair of rolling bearings 82 of the rack 81 will support such force, thereby compensating for smooth displacement of the rack 81.

The pinions 72 and rack 81 supported in this way are assembled in such a manner that teeth formed on outer peripheral edges of the pinions 72 are meshed with the toothed portions formed provided on both end portions of the rack 81, thereby constituting the gear transmitting mechanism 71. The gear transmitting mechanism 71 serves to minimize backlash and to increase pitch circle diameters of the pinions 72 to some extent (within a range that can prevent interference with other members). Accordingly, the inclination angles of the first trunnions 27 to which the pinions 72 are secured can exactly be coincided with the inclination angles of the first power rollers 45 supported by the first trunnions 27. Incidentally, although not shown, another gear transmitting mechanism having the same construction as the mechanism 71 is provided between the first trunnions 27 and the second trunnions 28 (FIG. 28) to coincide the inclination angles of the first trunnions 27 with the inclination angles of the second trunnions 28.

As mentioned above, in the toroidal type continuously variable transmission according to the present invention, the yokes 54, 55 as members constituting the first and second support means are directly supported by an secured to the inner surface of the casing 5. Thus, the posts 33a, 33b (FIGS. 26 to 28) which were required for the above-mentioned conventional arrangement can be omitted, with the result that the number of parts is reduced to facilitate manufacture, control and assembling of the parts, and a height of the toroidal type continuously variable transmission is decreased to make the transmission compact and light-weighted while ensuring the endurance.

In the present invention, the yokes 54, 55 support, at their four corners, the first and second pivot shafts 29, 30 provided on the ends of the four (in total) trunnions 27, 28 (two first trunnions 27 and two second trunnions 28). Thus, all of the forces acting on the first and second trunnions 27, 28 can be canceled within the yokes 54, 55. Now, this will be described with reference to FIG. 6. As mentioned above, when the toroidal type continuously variable transmission is driven, great thrust loads from the first and second power rollers 45, 46 act on the first and second trunnions 27, 28 along directions shown by the arrows α in FIG. 6. Each thrust load can be divided into a force component shown by the arrow β in FIG. 6 along the diametrical direction of the first or second cavity 34 or 35 (FIG. 1) and a force component shown by the arrow γ in FIG. 6 along the axial direction of the input shaft 1a.

Figure 6:
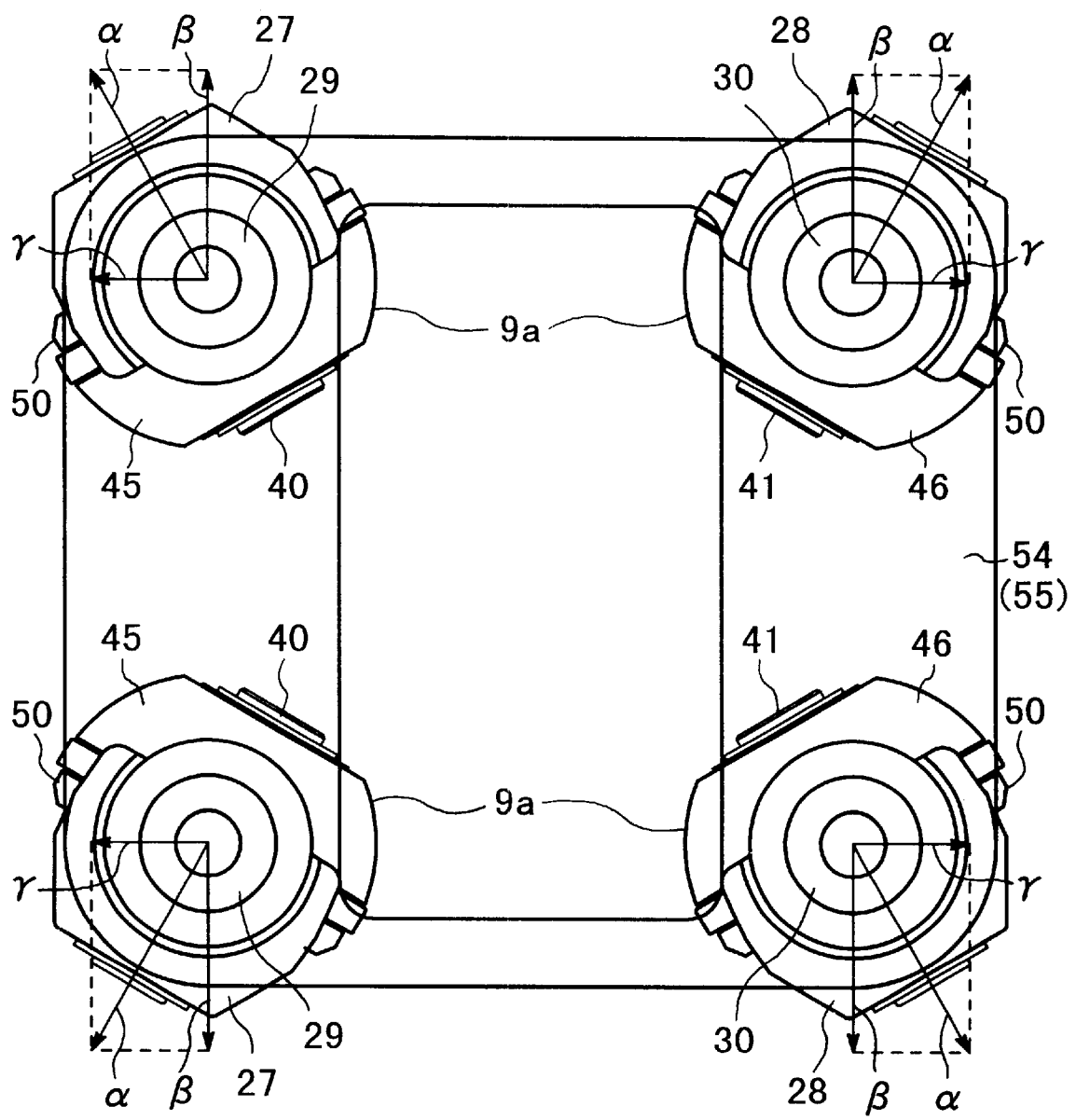
FIG. 6 is a view showing a condition that forces act on yokes constituting a toroidal type continuously variable transmission of double cavity type, looked at from the above in FIG. 1.

As apparent from FIG. 6 showing such directions of forces, the force components β along the diametrical directions of the first and second cavities 34, 35 have same magnitude and are directed in opposite directions at the first and second trunnions 27, 28 arranged in the same cavity. Further, the force components γ along the axial direction of the input shaft 1a have same magnitude and are directed in opposite directions at the first and second trunnions 27, 28 disposed in the adjacent cavities. Accordingly, all of the forces acting on the first and second trunnions 27, 28 are canceled within the yokes 54, 55 with the result that such forces do not act on the casing 5 supporting the yokes 54, 55. Thus, since the casing 5 is not subjected to great load, even when the wall thickness of the casing 5 is not increased so great, displacement of the support portions for the first and second pivot shafts 29, 30 can be prevented or the endurance of the casing 5 is not worsened.

Further, since the ball splines 56 and the radial needle bearings 57 are disposed between the first pivot shafts 29 and the yokes 54, 55, the first trunnions 27 can be displaced smoothly and correctly with respect to the yokes 54, 55. That is to say, as apparent from the aforementioned explanation, during the speed change operation of the toroidal type continuously variable transmission, the first trunnions 27 are displaced in the axial directions of the first pivot shafts 29, with the result that the first trunnions are rockingly displaced around the first pivot shafts 29. In the illustrated embodiment, among such displacements, the axial displacement is effected smoothly by the ball spline 56 and the rocking displacement is effected smoothly by the radial needle bearing 57, with the result that the speed change operation of the toroidal type continuously variable transmission based on such displacements can be effected quickly and correctly.

Figure 7:
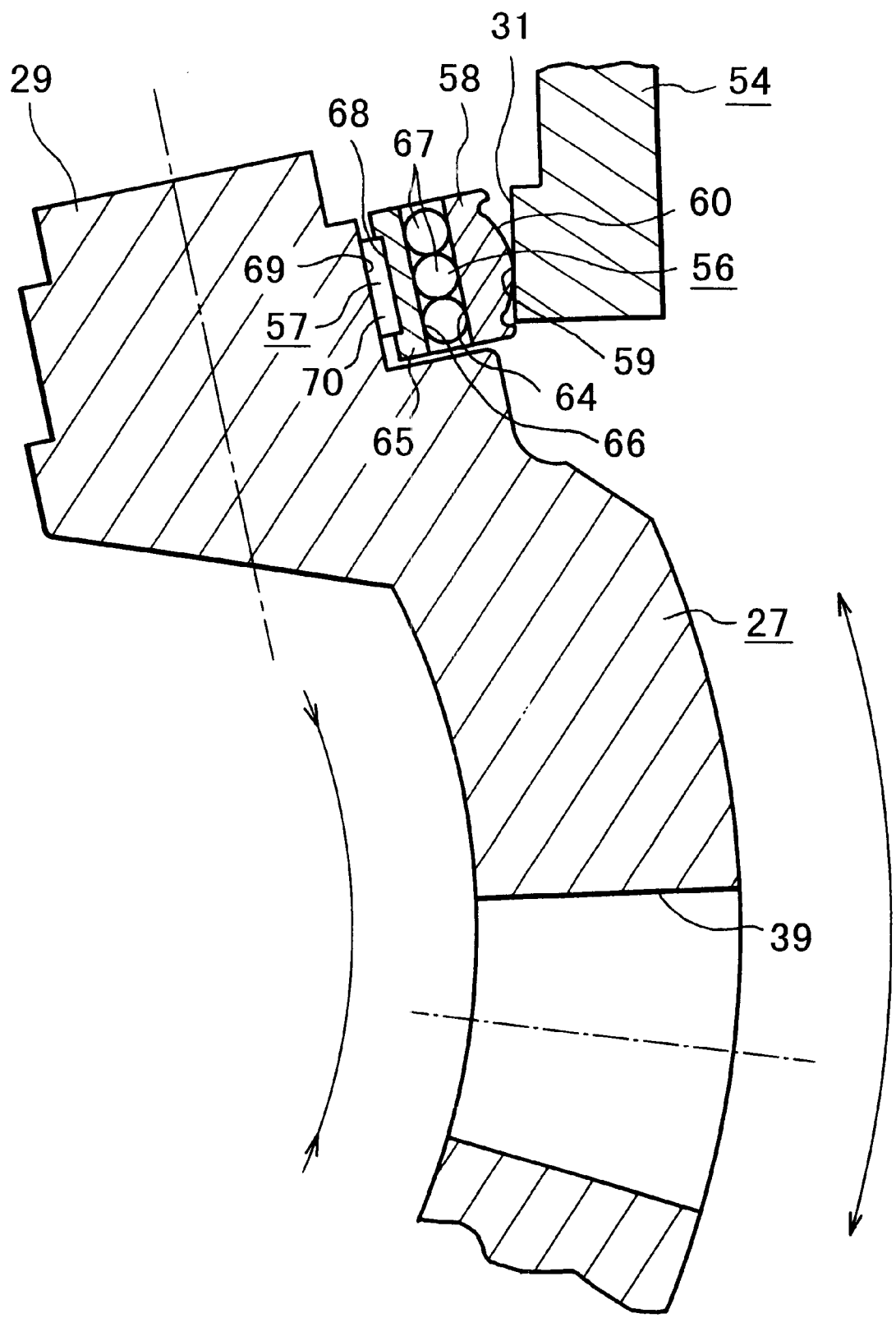
FIG. 7 is a partial sectional view corresponding to a right upper portion of FIG. 1, showing a deformed condition of a trunnion during operation in an exaggerated manner.

Further, since the outer peripheral surfaces of the ball spline outer races 58 are formed as the semi-spherical convex surfaces 60, regardless of elastic deformation of the first trunnions 27, edge load can be prevented from acting on the contact areas between the rolling surfaces of the needles 70 constituting the radial needle bearings 57 and the outer race track 68 and the inner race track 69. That is to say, when the toroidal type continuously variable transmission is driven, the great thrust loads act on the first power rollers 45, and, due to such thrust loads, the first trunnions 27 are elastically deformed so that the opposed inner surfaces thereof become concave, as shown in FIG. 7 in an aggregated manner. Due to such elastic deformation, the central axes of the first pivot shafts 29 are slightly deviated from the central axes of the support holes 31. To cope with this, in the arrangement according to the illustrated embodiment, the ball spline outer races 58 are rockingly displaced within the support holes 31. The central axes of the ball spline outer races 58 and the central axes of the ball spline inner races 65 (which also act as the outer races of the radial needle bearings 57) disposed within the ball spline outer races are maintained to be aligned with each other. In the arrangement according to the illustrated embodiment, misalignment between the central axes of the first pivot shafts 29 and the central axes of the support holes 31 is compensated in this way, thereby preventing application of the edge loads.

Further, as is in the illustrated embodiment, since the inclination angles of the first power rollers 45 are coincided with each other by the gear transmitting mechanism 71, great slip is prevented from occurring at the contact areas between the peripheral surfaces 9a of the first power rollers 45 and the inner surfaces 2a, 4a of the discs 17, 20, thereby well ensuring the efficiency of the toroidal type continuously variable transmission. Incidentally, although the gear transmitting mechanism 71 is effective to coincide the inclination angles of the first power rollers 45 with each other exactly and to coincide the inclination angles of the first power rollers 45 with and the inclination angles of the second power rollers 46 (FIG. 28) exactly, when the present invention is carried out, a synchronizing mechanism for coinciding the inclination angles of the first power rollers 45 with and the inclination angles of the second power rollers 46 is not limited to the illustrated gear transmitting mechanism 71. A synchronizing mechanism of cable type which is well known in the art and shown in FIGS. 29 and 30 may be used.

Figure 24:
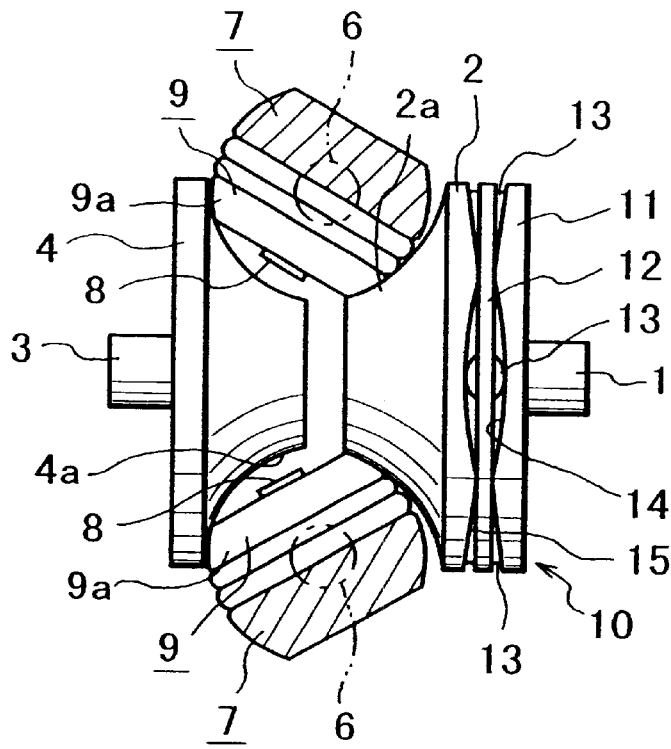
FIG. 24 is a side view showing a fundamental construction of a conventional toroidal type continuously variable transmission, in a maximum deceleration condition.
Figure 25:
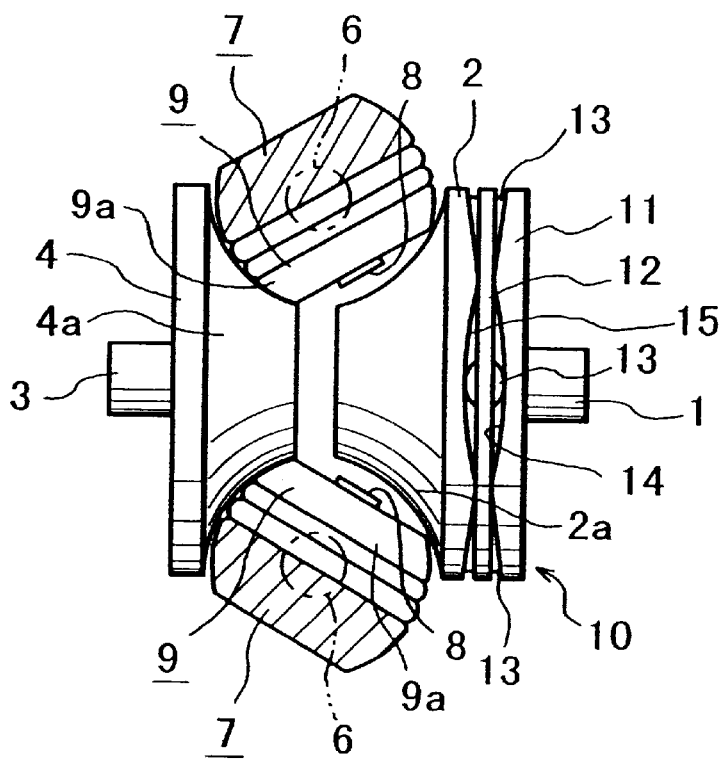
FIG. 25 is a side view similar to FIG. 24, in a maximum acceleration condition.

Further, the present invention is effective when it is applied to a toroidal type continuously variable transmission of double cavity type, in the points that the loads acting on the yokes can be substantially canceled within the yokes and the great load can be prevented from acting on the casing supporting the yokes. However, as shown in FIGS. 24 and 25, even in the toroidal type continuously variable transmission of single cavity type in which the single input disc 2 and the single output disc 4 are provided, a measure of effect can be expected. However, when the present invention is applied to the toroidal type continuously variable transmission of single cavity type, as shown in FIGS. 8A and 8B, in dependence upon the driving condition, a part of loads acting on the trunnions 7 from the power rollers 9 may act on the casing to which the yoke 88 is secured.

Figures 8A, 8B:
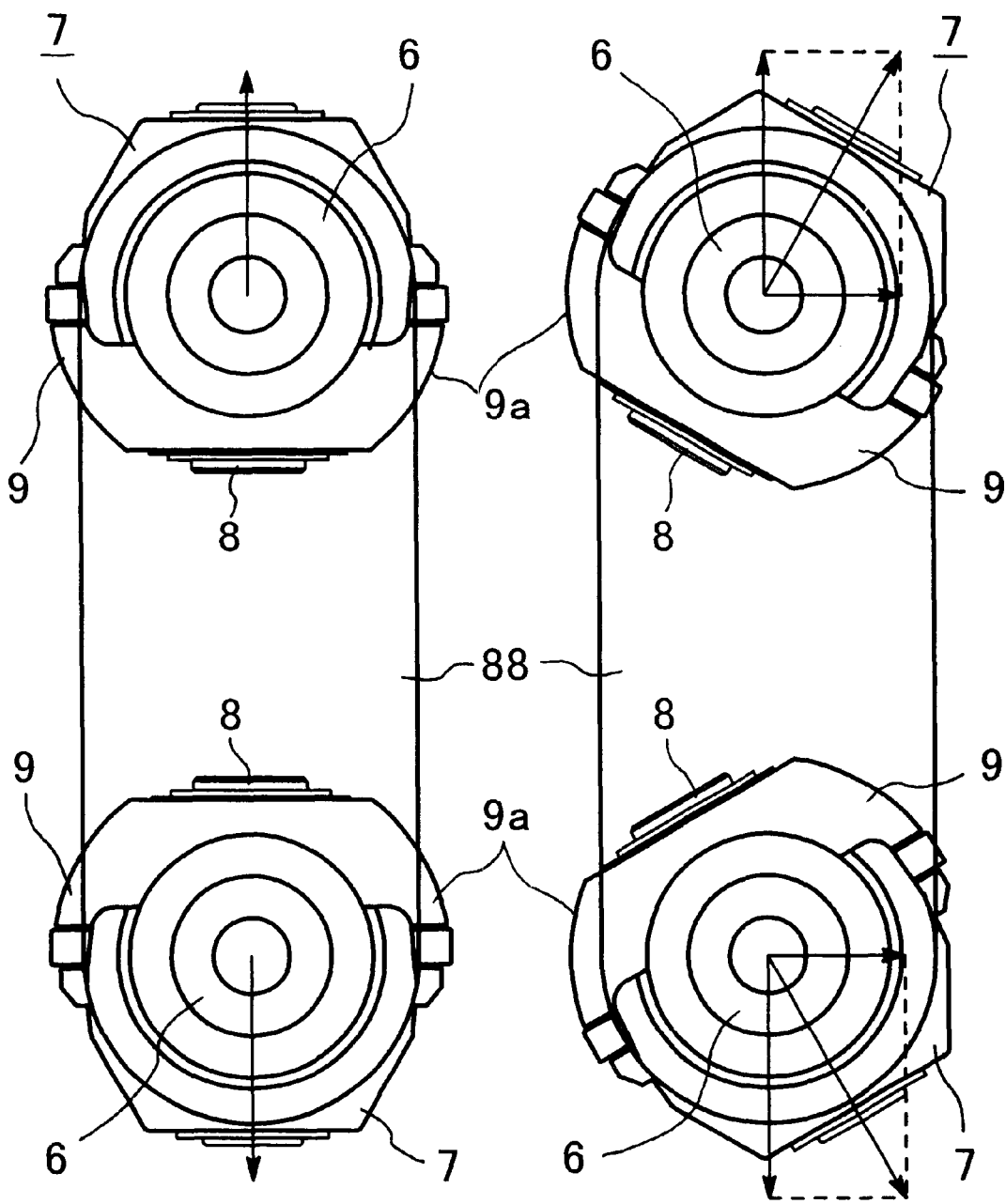
FIGS. 8A and 8B are views similar to FIG. 6, showing a condition that forces act on yokes constituting a toroidal type continuously variable transmission of single cavity type.

That is to say, when the rotational speed of the input disc 2 is the same as the rotational speed of the output disc 4 (speed change ratio=1), as shown in FIG. 8A, loads having the same magnitude and directing in opposite directions act on the trunnions 7. Accordingly, the loads acting on the trunnions 7 are substantially canceled within the yoke 88, with the result that any load does not act on the casing supporting the yoke 88. On the other hand, when the rotational speed of the input disc 2 differs from the rotational speed of the output disc 4 (speed change ratio≠1), as shown in FIG. 8B, among the loads acting on the trunnions 7, a load component along the axial direction of the input disc 2 and the output disc 4 cannot be canceled, and such load component acts on the casing. Since the load component acting on the casing in this way is smaller than the loads acting on the trunnions 7, when the yoke 88 is secured to the casing at plural locations, as is in the arrangement disclosed in the above Japanese Patent Laid-Open No. 10-274300, unlike to the arrangement in which the loads acting on the trunnions is transmitted to the casing as they are, there arises no practical problem regarding prevention of deformation of the casing and assurance of endurance of the casing.

<Second Embodiment>

Figure 9:
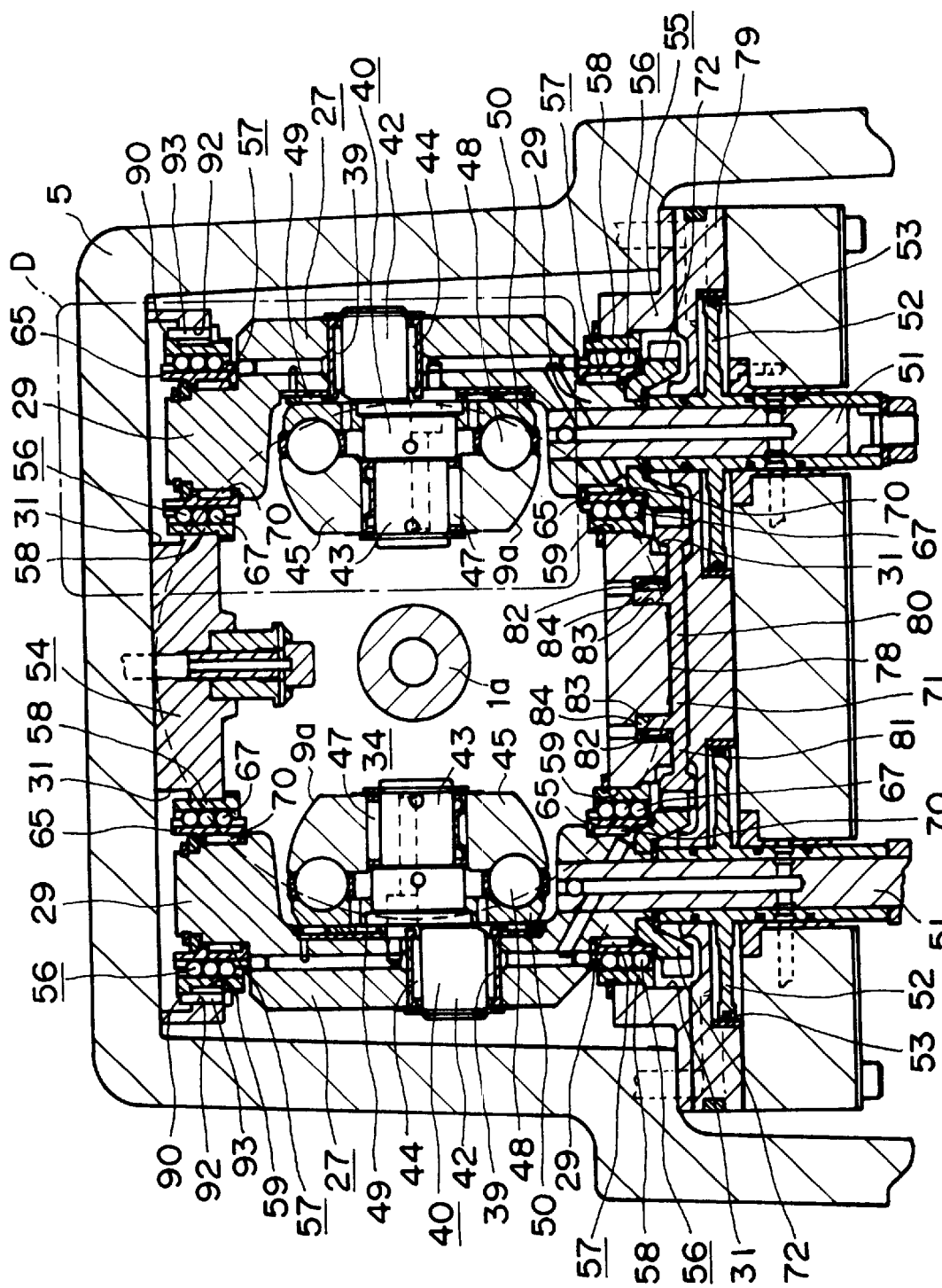
FIG. 9 is a sectional view corresponding to a sectional view taken along the line A—A in FIG. 26, showing a second embodiment of the present invention.
Figure 10:
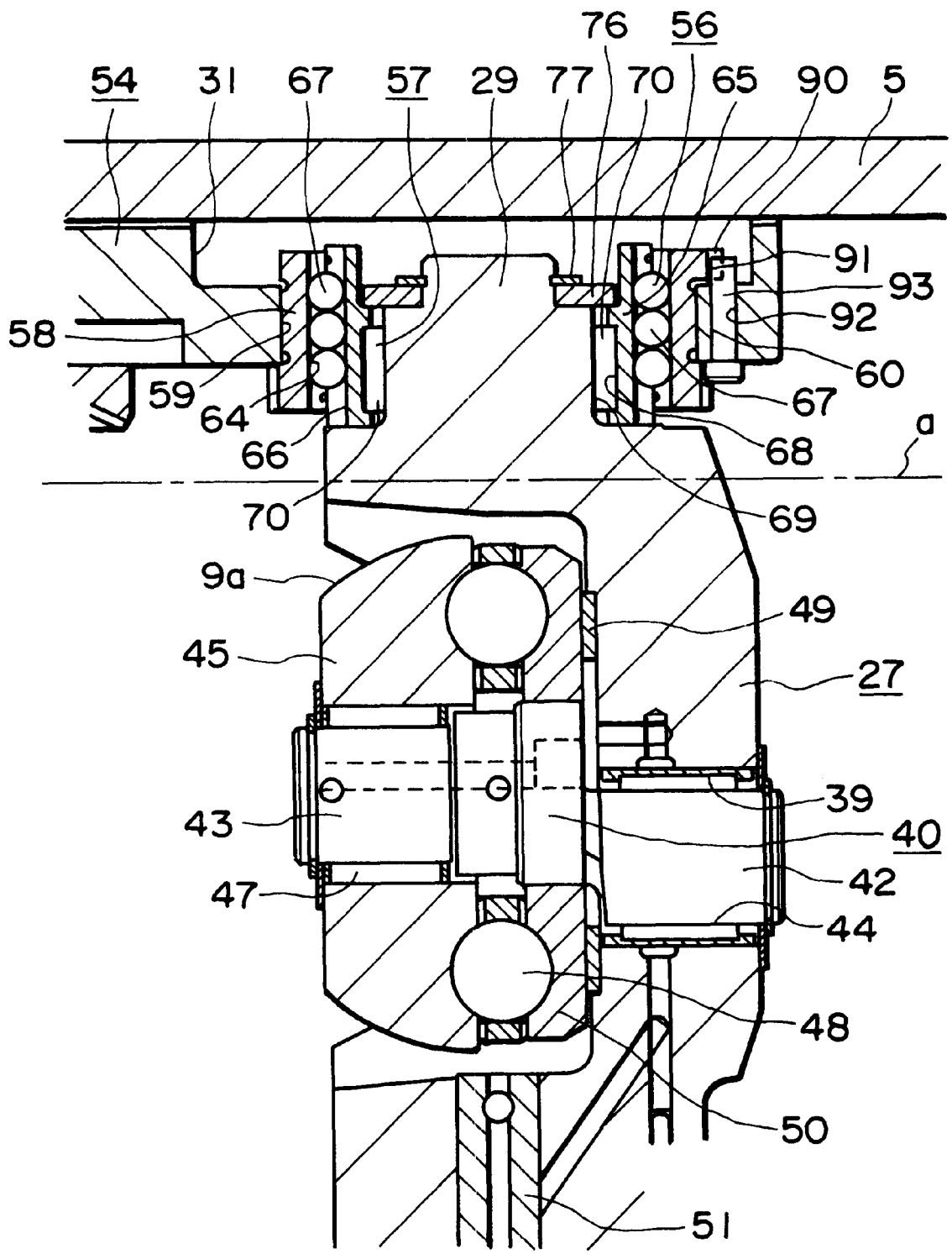
FIG. 10 is an enlarged view of a portion D in FIG. 9, where an area above a line a shows a sectional view taken along the line E-O-F in FIG. 11 and an area below the line a shows sectional view taken along the line E-O-G in FIG. 11.
Figure 11:
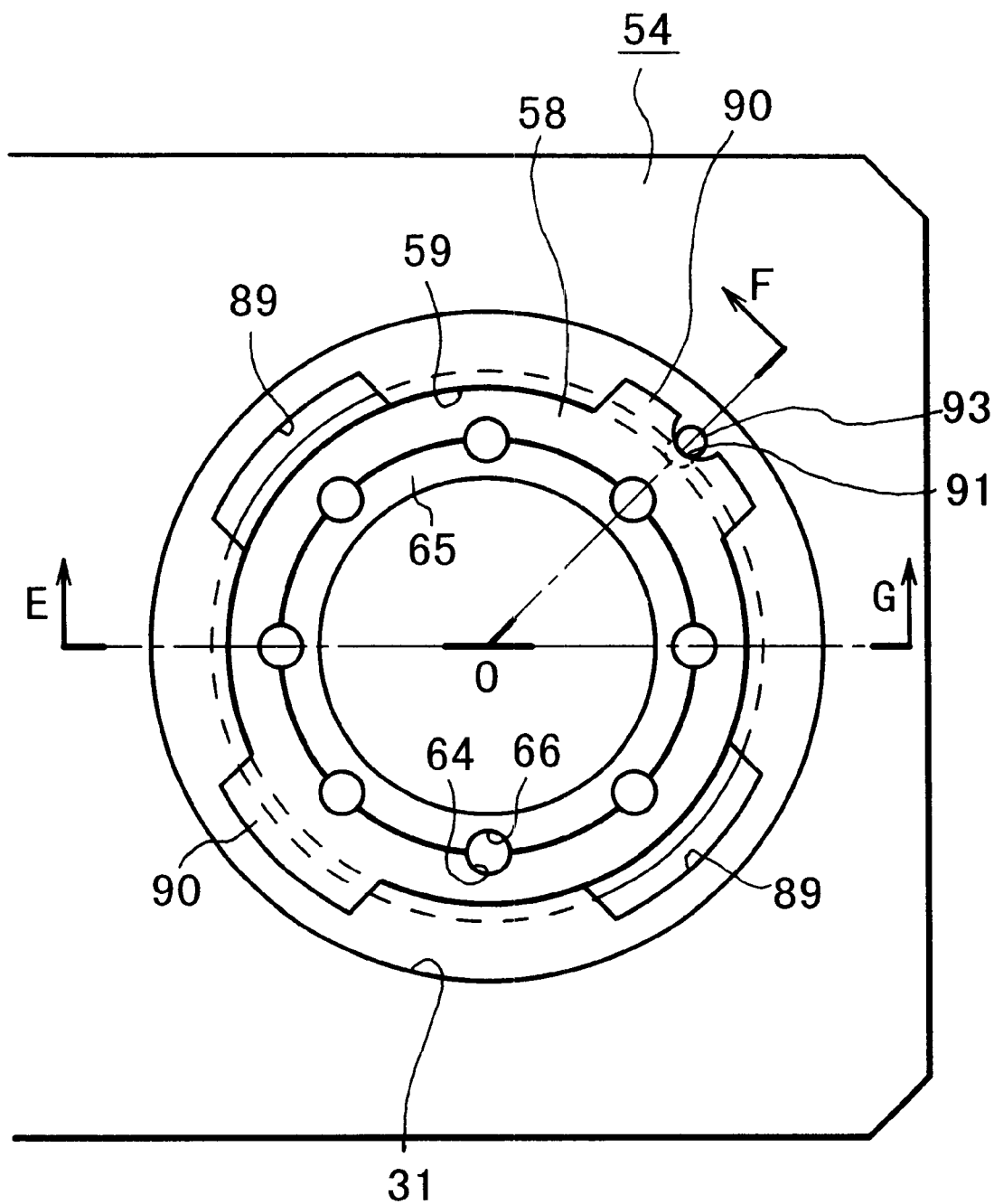
FIG. 11 is a view looked at from the above in FIG. 10, with a casing omitted.

FIGS. 9 to 11 show a second embodiment of the present invention. The second embodiment differs from the first embodiment, regarding an arrangement for supporting the first pivot shafts 29 remote from the drive rods 51 (among the first pivot shafts 29 provided on both ends of the first trunnions 27) with respect to the casing 5. That is to say, in the second embodiment, when the ball splines 56 for supporting the first pivot shafts 29 remote from the drive rods 51 with respect to the yoke 54 are assembled, the through hole 86 (FIGS. 4 and 5) used in the first embodiment are omitted and the lid plate 87 (FIG. 5) for closing the through hole 86 is also omitted, thereby reducing the cost and improving the strength of the casing 5.

To this end, in the second embodiment, notches 89 caved in the diametrical direction of the support hole 31 are formed in diametrically opposed positions (two positions) of the smaller diameter portion 59 formed in the half part of the opened portion of the support hole 31 of the yoke 54. Further, protrusions 90 capable of passing through the notches 89 are formed on diametrically opposed positions (two positions) of the outer peripheral surface of the proximal end (upper end in FIGS. 9 and 10) of the ball spline outer race 58. A locking notch 91 is formed in a central portion of an outer peripheral edge of one of the protrusions 90 (protrusion at the right in FIG. 10 and at the right and upper in FIG. 11). Further, in correspondence to the smaller diameter portion 59 of the support hole 31 formed in the yoke 54, a threaded hole 92 is formed in a portion aligned with the locking notch 91 between the notches 89, and a tip end of a set screw 93 threaded in the threaded hole 92 is engaged by the locking notch 91.

The construction according to the illustrated embodiment as mentioned above is assembled as follows. The radial needle bearing 57 and the ball spline 56 are previously attached to the end of the first pivot shaft 29. The dislodging of the plurality of balls 67 constituting the ball spline 56 is prevented by the stop ring locked to the inner peripheral surface of the end of the ball spline outer race 58 or the outer peripheral surface of the end of the ball spline inner race 65. In a condition that the notches 89 are aligned with the protrusions 90, the protrusions 90 are inserted into the support hole 31. Then, the ball spline outer race 58 is rotated by 90 degrees to align the locking notch 91 with the threaded hole 92. Then, the set screw 93 is threaded into the threaded hole 92 to enter the tip end of the set screw 93 into the locking notch 91. As a result, the notches 89 are deviated from the protrusions 90 and the ball spline outer race 58 can be maintained within the support hole 31. Since the other constructions and functions are the same as those in the first embodiment, the same elements are designated by the same reference numerals and duplicated explanation will be omitted.

<Third Embodiment>

Figure 12:
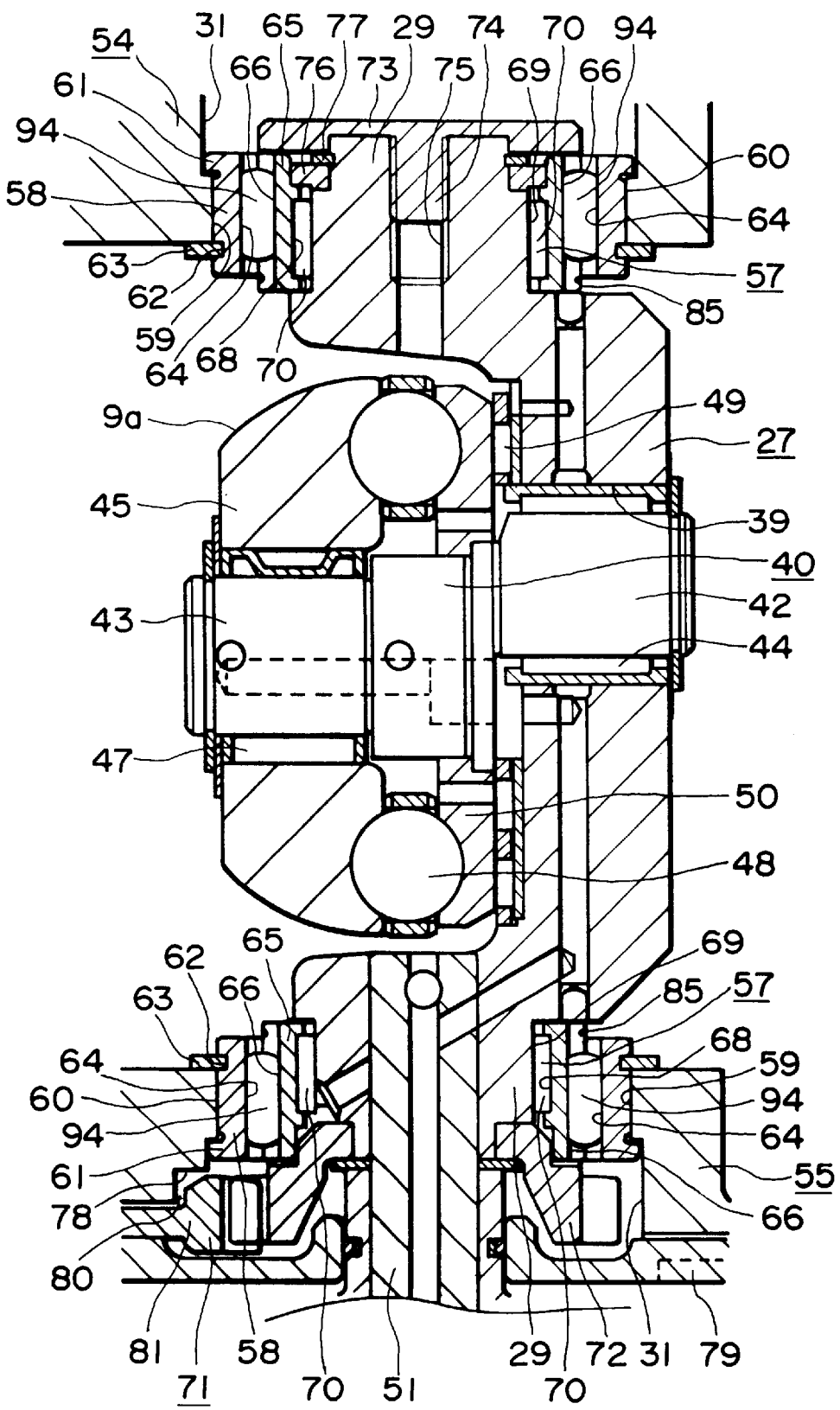
FIG. 12 is a view similar to FIG. 3, showing a third embodiment of the present invention.

FIG. 12 shows a third embodiment of the present invention. In the third embodiment, rollers 94 are disposed between the outer race side ball spline grooves 64 formed in the inner peripheral surface of the ball spline outer race 58 and the inner race side ball spline grooves 66 formed in the outer peripheral surface of the ball spline inner race 65, respectively. Accordingly, radial load capacity of the spline portion can be made greater. Incidentally, the rollers 94 are not rolling as the first pivot shafts 29 are shifted in the axial direction. Accordingly, in the third embodiment, although the force required for shifting the first pivot shafts 29 becomes greater than those in the first and second embodiments, since the axial shifting movement of the first pivot shafts 29 is effected by the drive cylinder 53 (FIGS. 1 and 9) with a strong force, so long as the diameter and oil pressure of the drive cylinder 53 are reserved, adequate practical response ability can be obtained. The other constructions and functions are the same as those in the first embodiment.

<Fourth Embodiment>

Next, a fourth embodiment of the present invention shown in FIGS. 13 and 14 will be explained. Incidentally, explanation of the same elements as those in the previous embodiments will be omitted.

In the fourth embodiment, among support holes 131, within the support holes 131 formed on one ends of yokes 154, 155, first pivot shafts 129 are supported by radial needle bearings 136 for rocking movement and axial displacement. Incidentally, outer peripheral surfaces of outer races 137 constituting the radial needle bearings 136 are formed as spherical convex surfaces so that edge loads are prevented from acting on contact areas between rolling surface of needles 138 constituting the radial needle bearings 136 and associated surfaces, regardless of elastic deformation of first trunnions 127.

That is to say, when the toroidal type continuously variable transmission is driven, great thrust loads act on first power roller 145, with the result that the first trunnions 127 are elastically deformed so that opposed inner surfaces thereof become concave by the thrust loads. Due to such elastic deformation, central axes of the first pivot shaft 129 are slightly deviated from central axes of the support holes 131. In such a case, the deviation is compensated by rocking the outer races 137 within the support holes 131, thereby preventing application of the edge load.

However, in case of the toroidal type continuously variable transmission of the present invention including the construction according to the illustrated embodiment, unlike to the conventional construction shown in FIGS. 26 to 28, since the yokes 154 are not displaced, the deviation between the central axes of the first pivot shafts 129 and the central axes of the support holes 131 is limited. That is to say, in the conventional construction, the inclination angles of the pair of opposed first power rollers 145 are coincided with each other by supporting the yokes 126a, 126b for slight displacement with respect to the casing 105 via the support posts 133a, 133b. Thus, when the toroidal type continuously variable transmission is driven, the central axes of the first pivot shaft 129 are deviated from the central axes of the support holes 131 not only by elastic deformation of the first trunnions 127 but also by displacement of the yokes 126a, 126b. Accordingly, in the conventional construction, it is inevitable that the radial needle bearings 136 are provided with the outer races 137 having spherical convex outer peripheral surfaces. To the contrary, in the illustrated embodiment, since the yokes 154, 155 are not displaced, as mentioned above, the deviation between the central axes of the first pivot shafts 129 and the central axes of the support holes 131 is limited. Accordingly, so long as occurrence of edge load can be prevented, for example, by providing "crowns" on the needles 138, as shown in FIG. 14, the outer races 137 can be omitted from the radial needle bearings 136.

Further, as mentioned above, in case of the toroidal type continuously variable transmission of the present invention including the construction according to the illustrated embodiment, since the yokes 154, 155 are not displaced, the yokes do not have functions for coinciding the inclination angles of the pair of opposed first power rollers 145 with each other. That is to say, although the inclination angles are adjusted by axial displacement amounts of drive rods 151 controlled by supplying or discharging the pressurized oil with respect to the drive cylinders 153, it is difficult to exactly coincide the inclination angles of the pair of first power rollers 145 by such axial displacement amounts. Thus, in the conventional construction, the inclination angles of the pair of first power rollers 145 have been exactly coincided with each other by permitting the displacement of the yokes 126a and by supporting the first power rollers 145 in a so-called floating fashion. However, in the toroidal type continuously variable transmission of the present invention, the inclination angles of the pair of first power rollers 145 cannot be coincided with each other by the displacement of the yokes 154, 155. Thus, in the illustrated embodiment, the inclination angles of the pair of first power rollers 145 supported by the first trunnions 127 are coincided with each other exactly by interconnecting the pair of opposed first trunnions 127 through a gear transmitting mechanism 156.

Figure 13:
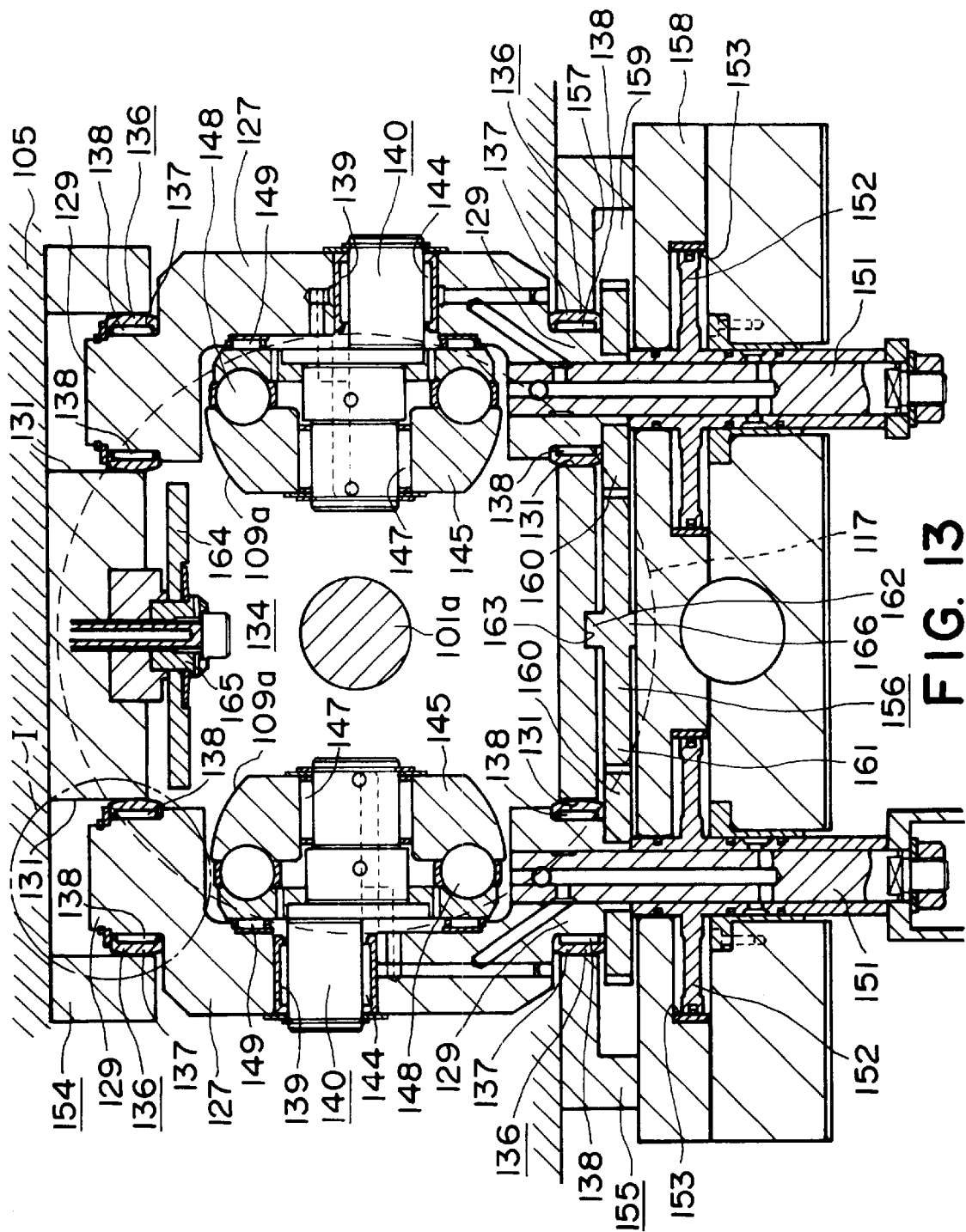
FIG. 13 is a sectional view corresponding to a sectional view taken along the line A—A in FIG. 26, showing a fourth embodiment of the present invention.
Figure 14:
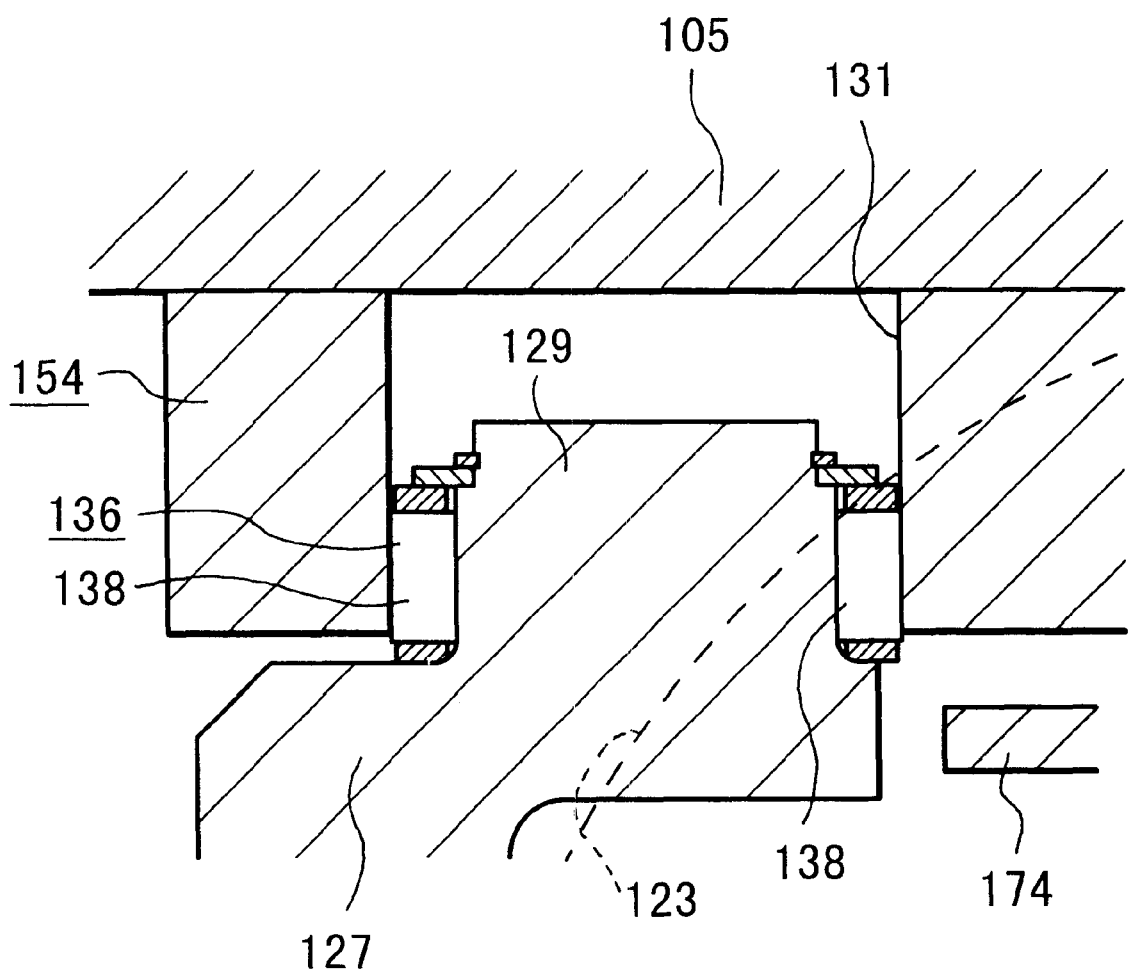
FIG. 14 is a view corresponding to a portion I in FIG. 13.
Figure 15:
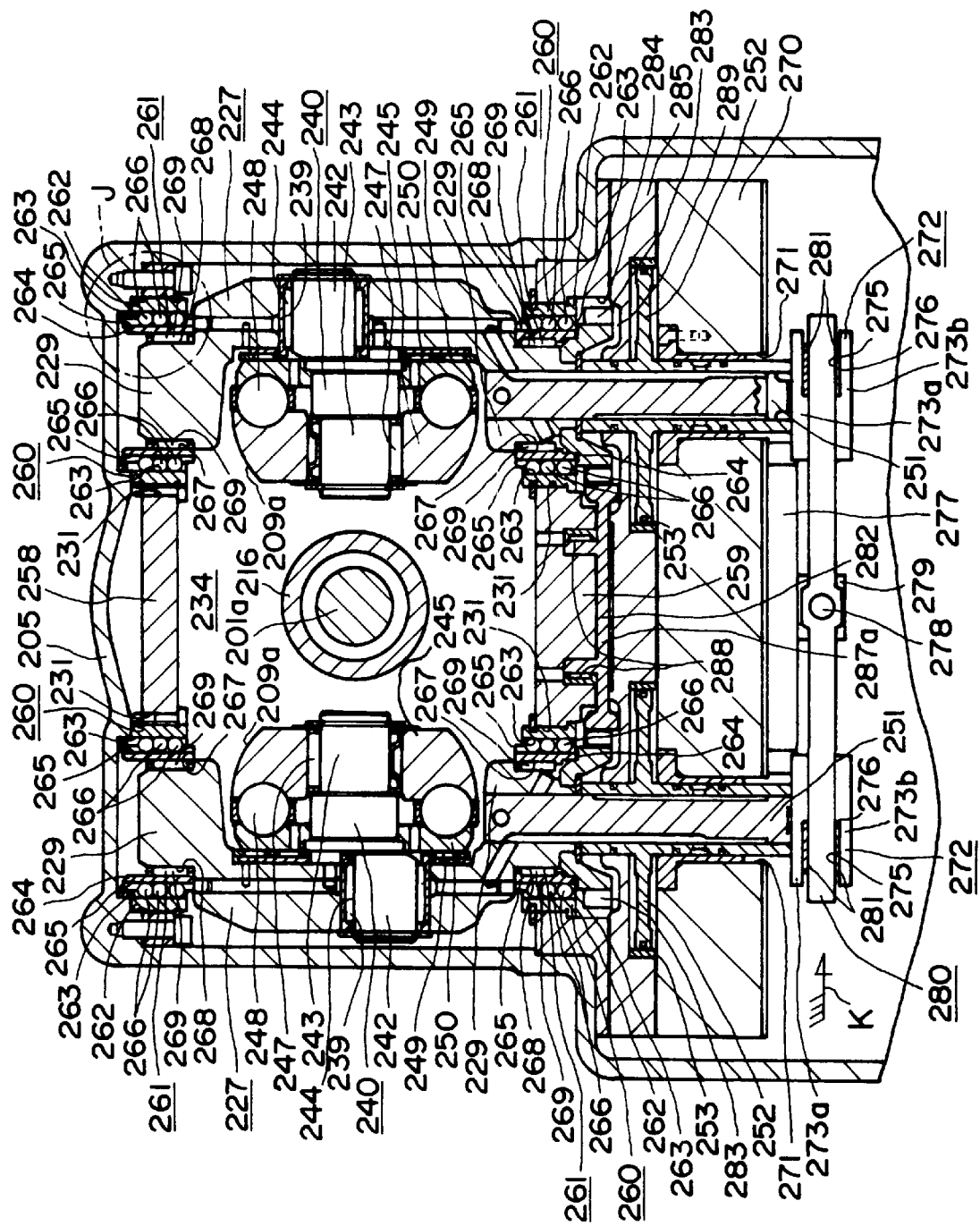
FIG. 15 is a sectional view corresponding to a sectional view taken along the line A—A in FIG. 26, showing a fifth embodiment of the present invention.
Figure 16:
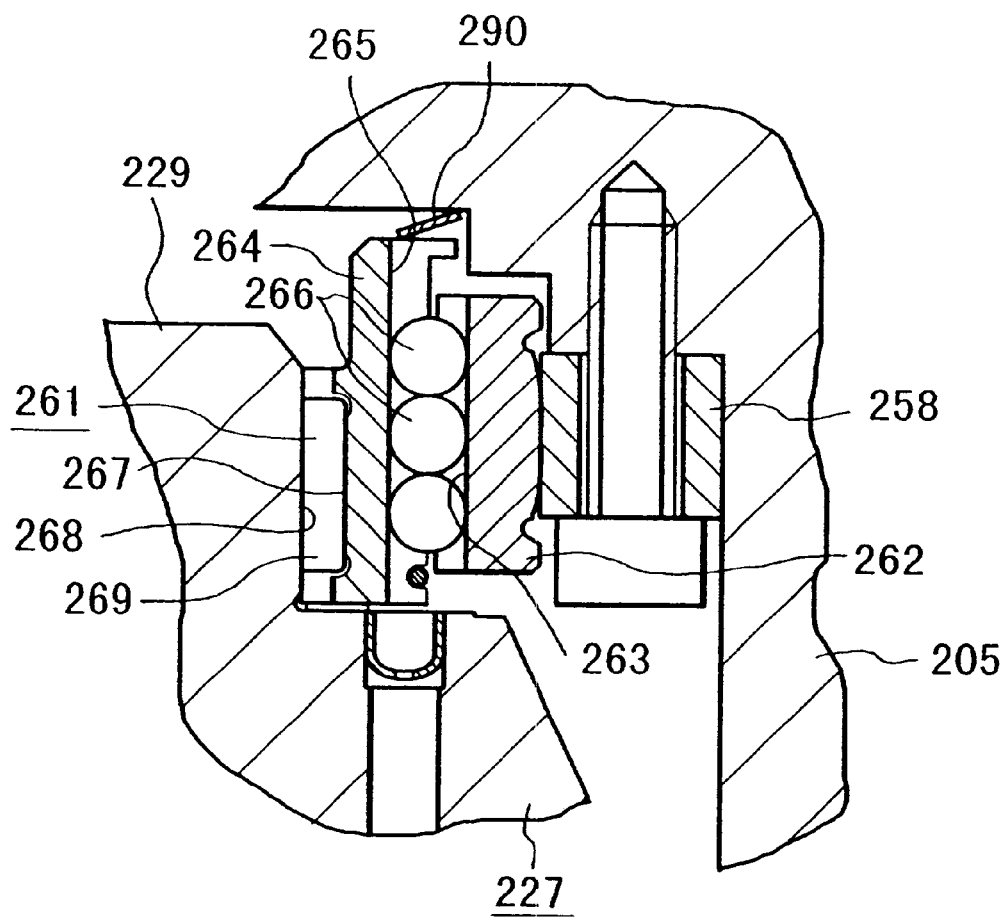
FIG. 16 is an enlarged view showing a portion J in FIG. 15.

To install the gear transmitting mechanism 156, one (lower one (155) in FIG. 13) of the yokes is provided with a recessed portion 157. Accordingly, in a condition that the recessed portion 157 and a cylinder case 158 are overlapped with each other, a space 159 for containing the gear transmitting mechanism 156 is defined between these members 155, 158. The gear transmitting mechanism 156 contained in this space 159 includes a pair of pinions 160 having the same configuration and the same number of teeth, an a rack 161 having toothed portions provided on both end portions and having the same pitch. The pinions 160 are fitted onto and secured to non-cylindrical portions formed on the tip ends of the first pivot shafts 129 provided on the ends of the first trunnions 127, or are supported by ball splines and the like for axial shifting movement without relative rotation. Accordingly, the first trunnions 127 are rotated in synchronous with the pinions 160.

The rack 161 can be displaced only along the axial direction (direction perpendicular to the plane of FIG. 13) of an input shaft 101a and is supported within the space 159. To this end, in the illustrated embodiment, a guide protruded portion 162 formed on a side surface of the rack 161 is engaged by a guide groove 163 formed in the bottom of the recessed portion 157. Further, a sliding protruded portion 166 is formed on the other side surface of the rack 161, and the sliding protruded portion 166 is slid with respect to the cylinder case 158, thereby preventing the rack 161 from shifting toward a fallen direction. Incidentally, a structure for supporting the rack 161 for parallel shifting movement only in one direction is not limited to the illustrated structure, but, various structures known in the art can be used. For example, an elongated hole extending the direction perpendicular to the plane of FIG. 13 may be formed in the rack 161, and a plurality of guide pins fixed along the direction perpendicular to the plane of FIG. 13 within the space 159 may be engaged by the elongated hole.

The pinions 160 and rack 161 supported in this way are assembled in such a manner that teeth formed on outer peripheral edges of the pinions 160 are meshed with the toothed portions formed provided on both end portions of the rack 161, thereby constituting the gear transmitting mechanism 156. The gear transmitting mechanism 156 serves to minimize backlash and to increase pitch circle diameters of the pinions 160 to some extent (within a range that can prevent interference with other members). Accordingly, the inclination angles of the first trunnions 127 to which the pinions 160 are secured can exactly be coincided with the inclination angles of the first power rollers 145 supported by the first trunnions 127. Incidentally, although not shown, another gear transmitting mechanism having the same construction as the mechanism 156 is provided between the first trunnions 127 and second trunnions 128 (refer to the reference numeral 28 in FIG. 28) to coincide the inclination angles of the first trunnions 127 with the inclination angles of the second trunnions 128.

Further, a stopper plate 164 provided at an upper central part in FIG. 13 serves to prevent the inclination angles of the first trunnions 127 from becoming too great and is disposed around a nozzle from 165 for supplying lubricating oil to contact areas between peripheral surfaces 109a of the first power rollers 145 and inner surfaces 102a of a first input disc 117 and inner surface 104a (FIG. 26) of a first output disc 120. Incidentally, in the above explanation, an example that the present invention is applied to the toroidal type continuously variable transmission of double cavity type was described. The present invention can achieve remarkable effect when it is applied to the toroidal type continuously variable transmission of double cavity type, the present invention can also be applied to a toroidal type continuously variable transmission of single cavity type as shown in FIGS. 24 and 25.

As mentioned above, in the toroidal type continuously variable transmission according to the present invention, the yokes 154, 155 as members constituting the first and second support means are directly supported by and secured to the inner surface of the casing 105. Thus, the posts 133a, 133b which were required for the above-mentioned conventional arrangement can be omitted and the outer races 137 constituting the radial needle bearings 136 can also be omitted, with the result that the number of parts is reduced to facilitate manufacture, control and assembling of the parts, and a height of the toroidal type continuously variable transmission is decreased to make the transmission compact and light-weighted while ensuring the endurance. Further, as is in the illustrated embodiment, since the inclination angles of the first power rollers 145 are coincided with each other by the gear transmitting mechanism 156, considerable slip can be prevented from occurring in the contact areas between the peripheral surfaces 109a of the first power rollers 145 and inner surfaces 102a, 104a of the discs, thereby well ensuring the efficiency of the toroidal type continuously variable transmission.

Since the present invention has the above-mentioned arrangement and function, a toroidal type continuously variable transmission which can be manufactured cheaply with compact and light-weighted and which has excellent transmitting efficiency can be provided.

<Fifth Embodiment>

Now, a fifth embodiment of the present invention will be described.

The above-mentioned gear transmitting mechanism 71 (or 156) is designed in consideration of the fact that the inclination angles of the trunnions and accordingly the power rollers caused by the axial displacement of the drive rods 51 (or 151) are coincided with each other, but is not intended to synchronize the axial displacements of the drive rods 51 themselves. The axial displacements of the drive rods 51 are synchronized by controlling the oil pressure introduced into the drive cylinders 53. Thus, in the transition immediately after the speed change operation is started, the inclination angles of the trunnions 27, 28 differ from each other delicately, and, as the case may be, slid may occur in the contact areas between the peripheral surfaces 9a of the power rollers 45, 46 and the inner surfaces 2a, 4a of the discs 2, 4, 17, 18, 20, 21.

The slip generated in the contact areas for this reason is apt to occur when the trunnions 27, 28 are quickly shifted in the axial directions of the pivot shafts 29, 30 in order to effect the speed change operation quickly. If the slip is generated, since not only the power transmitting efficiency is worsened but also life of rolling fatigue of each surface is shortened, the occurrence of the slip is not preferable. In order to permit the quick speed change operation while preventing the transmitting efficiency from worsening and the life of rolling fatigue from shortening, it is necessary to realize a structure in which the axial displacements of the drive rods 51 themselves are synchronized with each other exactly.

A toroidal type continuously variable transmission according to the fifth embodiment is devised in consideration of the above circumstances.

FIGS. 15 to 20 show the fifth embodiment of the present invention. Incidentally, this embodiment is characterized in that it has a specific construction for positively synchronizing inclination angles of first trunnions 227 with inclination angles of second trunnions 228 (refer to reference numeral 28 in FIG. 28) and a specific construction for supporting first pivot shafts 229 provided on both ends of the first trunnions 227 and second pivot shafts 230 (refer to reference numeral 30 in FIG. 28) provided on both ends of the second trunnions 228. Since the other constructions and functions are the same as those of the conventional technique shown in FIGS. 26 to 28, illustration and explanation of the similar elements are omitted or simplified, and the characteristics of this embodiment will be described mainly.

A pair of yokes 258, 259 are directly secured to opposed portions of the casing 205. Circular support holes 231 are formed in four corners of the yokes 258, 259 at areas aligned with each other. Within the support holes 231, the first pivot shafts 229 are supported via ball splines 260 and radial needle bearings 261 for axial displacement and rocking movement.

Ball spline outer races 262 constituting the ball splines 260 are fitted into the support holes 231 in a condition that the axial displacement of the races is limited. A plurality of outer race side ball spline grooves 263 extending in an axial direction (up-and-down direction in FIGS. 15 and 16) are formed in inner peripheral surfaces of the ball spline outer races 262. And, ball spline inner races 264 (also acting as outer races of the radial needle bearings 261) are disposed within the interiors of the ball spline outer races 262 in coaxial with the radial needle bearings 261. Inner race side ball spline grooves 265 extending in an axial direction are formed in portions of the outer peripheral surfaces of the ball spline inner races 264 which are opposed to the outer race side ball spline grooves 263. A plurality of balls 266 are disposed between the respective inner race side ball spline grooves 265 and the respective outer race side ball spline grooves 263, thereby constituting the ball splines 260. Incidentally, any play of the ball spline outer races 262 is prevented by elastic members such as coned disc springs 290.

Cylindrical outer race tracks 267 for the radial needle bearings 261 are provided on inner peripheral surfaces of the ball spline inner races 264. A plurality of needles 269 are disposed between the respective outer race tracks 267 and respective cylindrical inner race tracks 268 formed on the outer peripheral surfaces of the first pivot shafts 229 provided on both ends of the first trunnions 227, thereby constituting the radial needle bearings 261.

Figure 17:
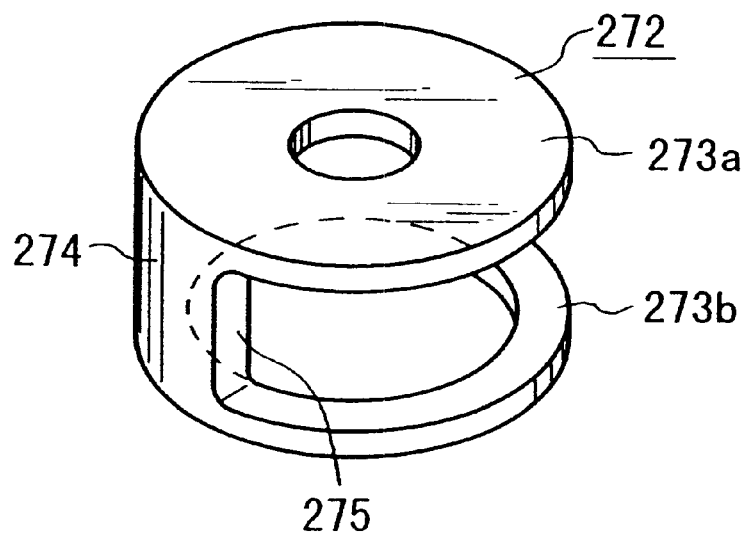
FIG. 17 is a perspective view of a receiving piece.

Drive rods 251 having proximal ends (upper ends in FIG. 15) connected to one ends of lower first pivot shafts among the first pivot shafts 229 provided on both ends of the first trunnions 227 extends through through-holes 271 formed in a valve body 270 secured to the casing 205. Receiving pieces 272 as shown in FIG. 17 are secured to tip ends (lower ends in FIG. 15) of the drive rods 251 protruded from an outer surface (lower surface in FIG. 15) of the valve body 270. The receiving pieces 272 are constituted by circumferential parts of peripheral edges of a pair of parallel ring portions 273a, 273b via a partial cylindrical connecting portion 274, and an opening portion 275 is defined by portions deviated from the connecting portion 274. Among the ring portions 273a, 273b, an inner diameter of one (upper one in FIGS. 15 and 17) ring portion 273a is relatively small so that only a male threaded portion formed on the drive rod 251 can pass through such a ring portion. On the other hand, an inner diameter of the other (lower one is FIGS. 15 and 17) ring portion 273b is relatively great so that a nut 276 to be threaded onto the male threaded portion and a tool for tightening the nut 276 can pass through such a ring portion.

Figure 18:
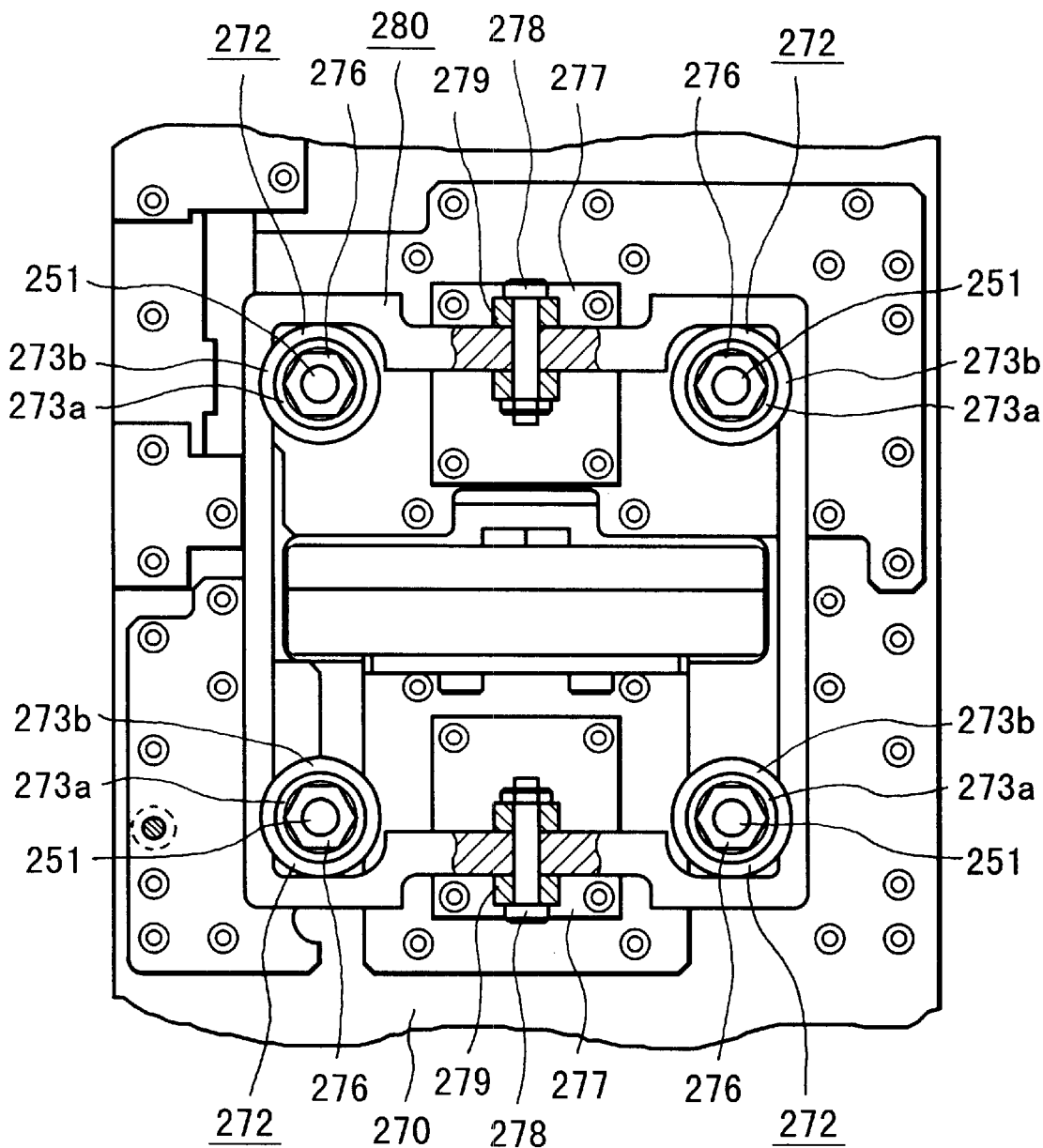
FIG. 18 is a view looked at from the below in FIG. 15, showing a mechanism for synchronizing axial displacement movements of drive rods.
Figure 19:
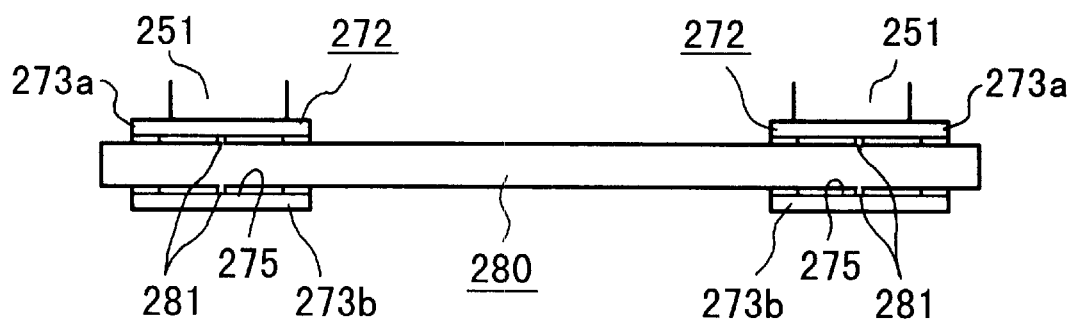
FIG. 19 is a view looked at from a direction shown by arrow K in FIG. 15.
Figure 20:
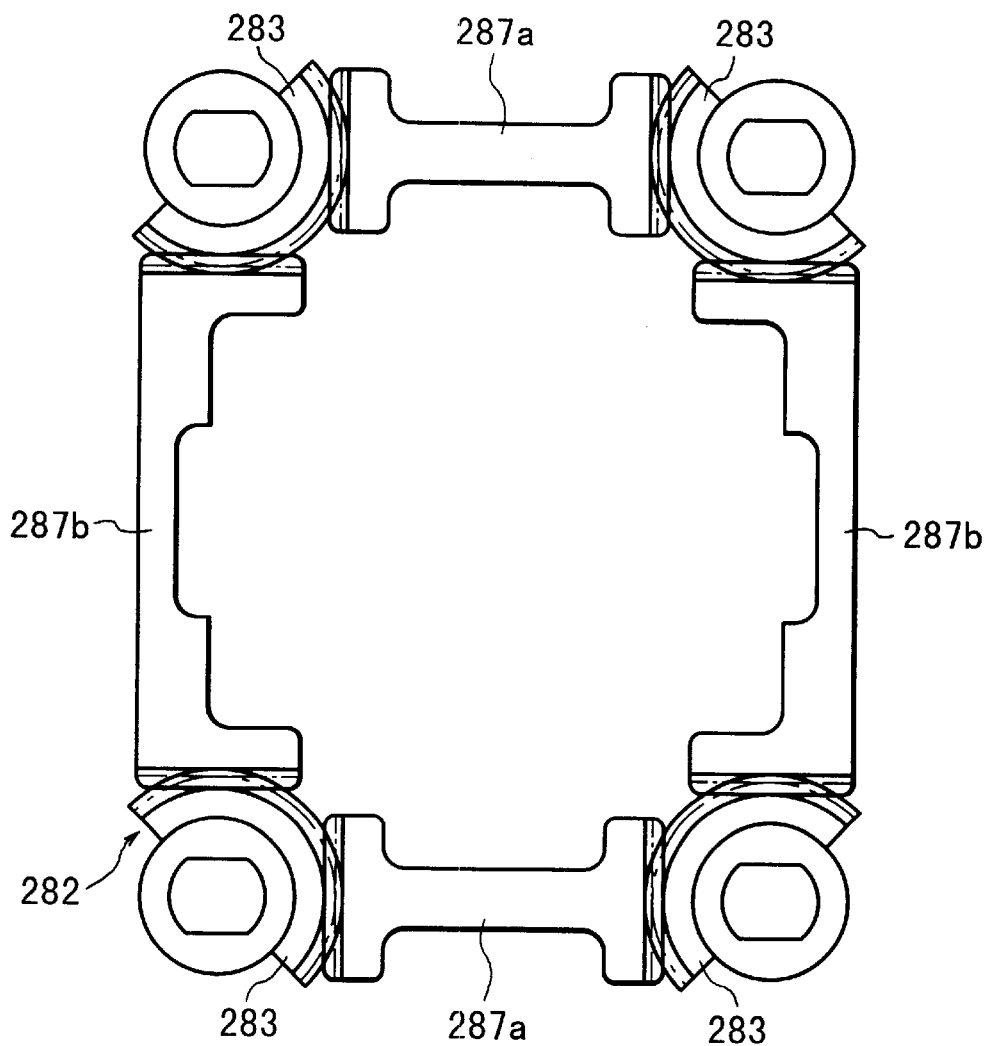
FIG. 20 is a view looked at from the below in FIG. 15, showing a gear transmitting mechanism.

Pivot brackets 279 having second pivot shafts 278 are provided on attachment substrate plates 277 secured to the outer surface of the valve body 270. The second pivot shafts 278 extend in parallel with rotational axes of first and second input discs 217 and first and second output discs 220, 221 (FIG. 12) and are disposed at positions opposed to sides of first and second cavities 234, 235 (FIG. 12). The second pivot shafts 278 rockably support width-wise (left-and-right direction in FIG. 18) central portions of both longitudinal (up-and-down direction in FIG. 18) ends of a rocking arm 280 formed as a substantially square frame as shown in FIG. 18. Accordingly, both width-wise ends of the rocking arm 280 are displaced in opposite directions by the same amount with respect to the axial direction of the drive rods 251.

The both longitudinal ends of both width-wise ends of the rocking arm 280 are engaged by the opening portion 275 between the pair of ring portions 273a, 273b constituting the receiving pieces 272 so that any play is not generated even when the rocking arm is rocked around the second pivot shafts 278. To this end, in the illustrated embodiment, small projections 281 are formed on areas of both surfaces of the both longitudinal ends of both width-wise ends of the rocking arm 280 which are opposed to the ring portions 273a, 273b, and tip ends of the small projections 281 abut against opposed surfaces of the ring portions 273a, 273b. Accordingly, axial displacements (along the axial directions of the first and second pivot shafts 229, 230) of the receiving pieces 272 and of the first and second trunnions 227, 228 fixedly connected to the receiving pieces 272 via the drive rods 25a are mechanically synchronized exactly. Incidentally, a precess cam is secured to any trunnion or the drive rod fixedly connected to any trunnions so that feedback control for activating a control valve for supplying or discharging pressurized oil with respect to the drive cylinders 253 is effected by the precess cam.

Further, in the illustrated embodiment, the first and second trunnions 227, 228 are interconnected by a gear transmitting mechanism 282. To install the gear transmitting mechanism 282, one (lower one (259) in FIG. 15) of the yokes is provided with a recessed portion 284. Accordingly, in a condition that the yoke 259 and a cylinder case 285 are overlapped with each other, a space 289 for containing the gear transmitting mechanism 282 is defined between these members 259, 285. The gear transmitting mechanism 282 contained in this space 289 includes a pair of pinions 283 having the same configuration and the same number of teeth, and four racks 287a, 287b having toothed portions provided on both end portions and having the same pitch. The pinions 283 are fitted onto and secured to non-cylindrical portions formed on the tip ends of the first and second pivot shafts 229, 230 provided on the ends of the first and second trunnions 227, 228. Accordingly, the first and second trunnions 227, 228 are rotated in synchronous with the pinions 283. Incidentally, when the speed change ratio is changed, the first and second trunnions 227, 228 are displaced in the axial directions of the first and second pivot shafts 229, 230. Accordingly, by providing moderate (an amount which does not arise any problem regarding the coincidence of the inclination angles) backlash in engagement areas between the pinions 283 and the racks 287a, 287b, relative displacement between the pinions 283 and the racks 287a, 287b is permitted.

The racks 287a, 287b can be displaced only along the axial direction (direction perpendicular to the plane of FIG. 15 or left-and-right direction in FIG. 15; left-and-right direction or up-and-down direction in FIG. 20) of the input shaft 1a and are supported within the space 289. To this end, in the illustrated embodiment, the racks 287a, 287b are supported by pairs of translation rolling bearings (linear bearings) 288 for parallel shifting movement with respect to the yokes 259. Accordingly, the racks 287a, 287b can smoothly be displaced with a light force without inclination. Further, if a force directing perpendicular to the displacing direction acts on the racks 287a, 287b, any one of the pair of rolling bearings 288 of the racks 287a, 287b will support such force, thereby compensating for smooth displacement of the racks 287a, 287b.

The pinions 283 and racks 287a, 287b supported in this way are assembled in such a manner that teeth formed on outer peripheral edges of the pinions 283 are meshed with the teeth formed provided on both end portions of the racks 287a, 287b, thereby constituting the gear transmitting mechanism 282. The gear transmitting mechanism 282 serves to minimize backlash and to increase pitch circle diameters of the pinions 283 to some extent (within a range that can prevent interference with other members). Accordingly, the inclinations angles of the first and second trunnions 227, 228 to which the pinions 283 are secured can exactly be coincided with the inclination angles of the first and second power rollers 245, 246 supported by the first and second trunnions 227, 228.

As mentioned above, in the toroidal type continuously variable transmission of the present invention, the displacements of the first and second trunnions 227, 228 along the axial directions of the first and second pivot shafts 229, 230 are mechanically synchronized with each other exactly by the rocking arm 280. Accordingly, during the speed change operation, the displacement amounts of the first and second trunnions 227, 228 are coincided with each other quickly and exactly, with the result that, during the speed change operation, any slip can be prevented from generating in the contact areas between the inner surfaces 202a, 204a (FIG. 26) of the first and second input discs 217, 218 and the first and second output discs 220, 221 and the peripheral surfaces 209a (FIGS. 15, 27 and 28) of the first and second power rollers 245, 246.

Figure 21:
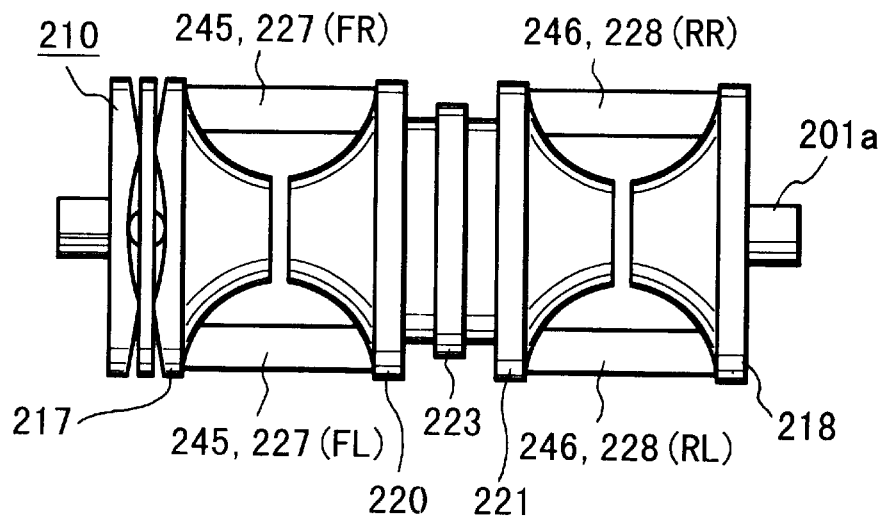
FIG. 21 is a substantially plan view of a toroidal type continuously variable transmission, for explaining a measured portion in a test effected to confirm an effect of the invention.
Figure 23A:
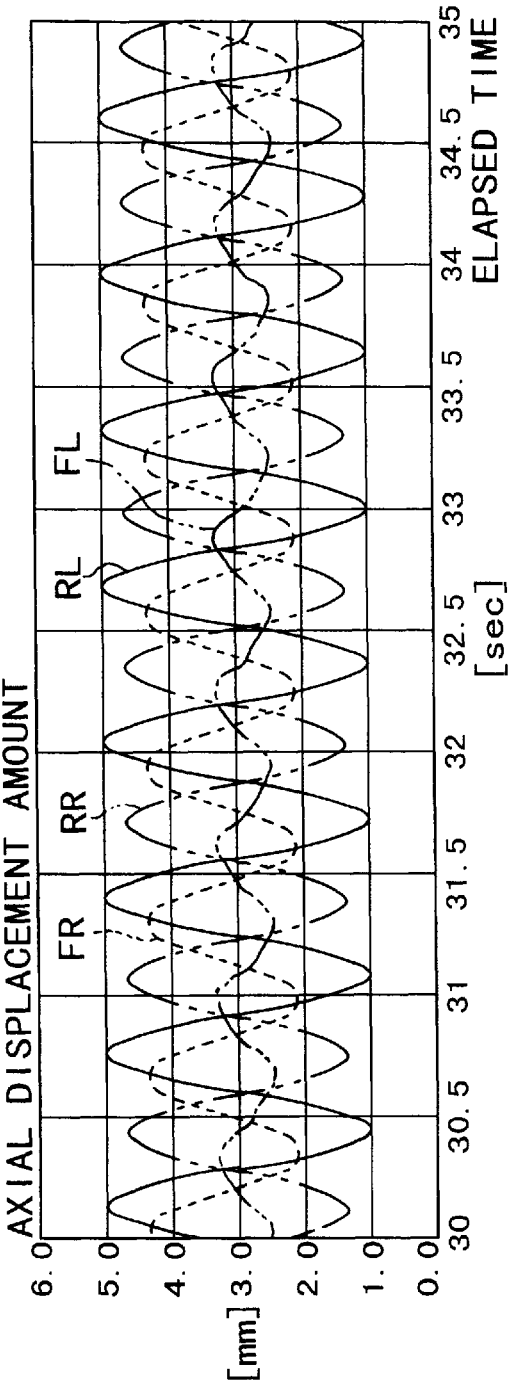
FIGS. 23A and 23B are graphs showing displacement conditions of trunnions constituting a conventional toroidal type continuously variable transmission.
Figure 23B:
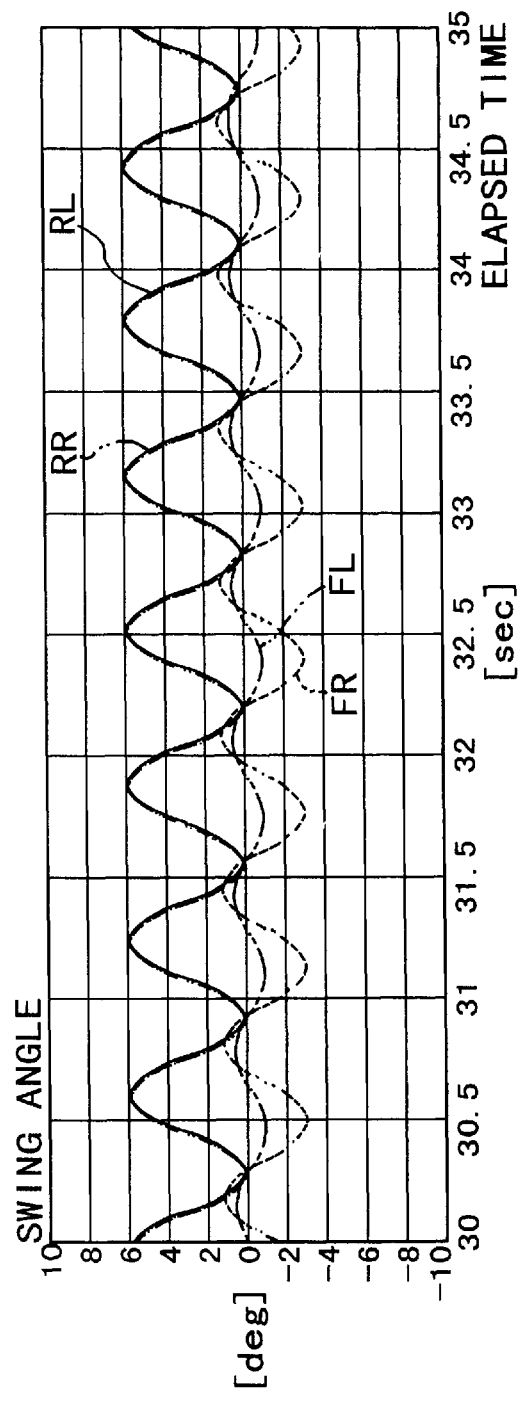

A result of tests effected for ascertaining the effect of the present invention regarding this will now be explained with reference to FIGS. 22A to 23B. The tests were carried out by using the toroidal type continuously variable transmission of double cavity type in which a pair of power rollers are provided for each of the cavities, as shown in FIG. 21. In the tests, regarding four trunnions 227, 228 supporting front right (FR) and front left (FL) power rollers near the pressing device 210 and rear right (RR) and rear left (RL) power rollers remote from the pressing device, respectively (i.e., supporting four (in total) power rollers 245, 246), during the speed change operation, the axial displacement amounts and rocking angles of the trunnions 227, 228 caused after predetermined pressurized oil was introduced into the drive cylinders were measured in connection with elapsed time. FIGS. 22A and 22B show a test result of the toroidal type continuously variable transmission of the present invention, where FIG. 22A shows the axial displacement amounts of the trunnions, and FIG. 22B shows the rocking angles of the trunnions. FIGS. 23A and 23B show a case where the displacements of the trunnions were adjusted only by adjusting the oil pressure, where FIG. 23A shows the axial displacement amounts of the trunnions, and FIG. 23B shows the rocking angles of the trunnions. As apparent from FIGS. 22A to 23B showing the test results, according to the present invention, even when the quick speed change operation is effected, the displacements of the trunnions can positively be synchronized with each other.

Further, in the toroidal type continuously variable transmission according to the illustrated embodiment, the yokes 258, 259 constituting the first and second support means are directly supported by and secured to the inner surface of the casing 205. Thus, the support posts 233a, 233b (refer to reference numerals 33a, 33b in FIGS. 27 and 28) which were required in the conventional arrangement can be omitted, with the result that the number of parts is reduced to facilitate manufacture, control and assembling of the parts, and a height of the toroidal type continuously variable transmission is decreased to make the transmission compact and light-weighted while ensuring the endurance.

Further, since the ball splines 260 and the radial needle bearings 261 are disposed between the first pivot shafts 229 and the yokes 258, 259, the displacements of the first and second trunnions 227, 228 with respect to the yokes 258, 259 can be effected smoothly and correctly. That is to say, as apparent from the aforementioned explanation, during the speed change operation of the toroidal type continuously variable transmission, the first and second trunnions 227, 228 are displaced along the axial directions of the first and second pivot shafts 229, 230, with the result that the trunnions are rockingly displaced around the first and second pivot shafts 229, 230 due to the axial displacements. In the illustrated embodiment, among these displacements, the axial displacements are effected smoothly by the ball splines 260 and the rocking displacements are effected smoothly by the radial needle bearings 261, so that the speed change operation of the toroidal type continuously variable transmission based on such displacement can be effected quickly and correctly.

Further, as is in the illustrated embodiment, since the gear transmitting mechanism 282 is provided, even if an oil pressure supplying circuit for the drive cylinders 252 is damaged, the inclination angels of the first and second power rollers 245 can be coincided with each other. Thus, even in malfunction, any severe slip can be prevented from generating in the contact areas between the peripheral surfaces 209a of the first and second power rollers 245 and the inner surfaces 202a, 204a of the discs 217, 218, 220, 221, thereby preventing damage of the toroidal type continuously variable transmission.

Since the present invention has the above-mentioned construction and function, the quick speed change operation can be effected while ensuring the endurance, and, thus, possibility of application of the toroidal type continuously variable transmission to high ability vehicles such as sports cars is increased. Therefore, the present invention contributes to practical use of toroidal type continuously variable transmissions.

Figure 29:
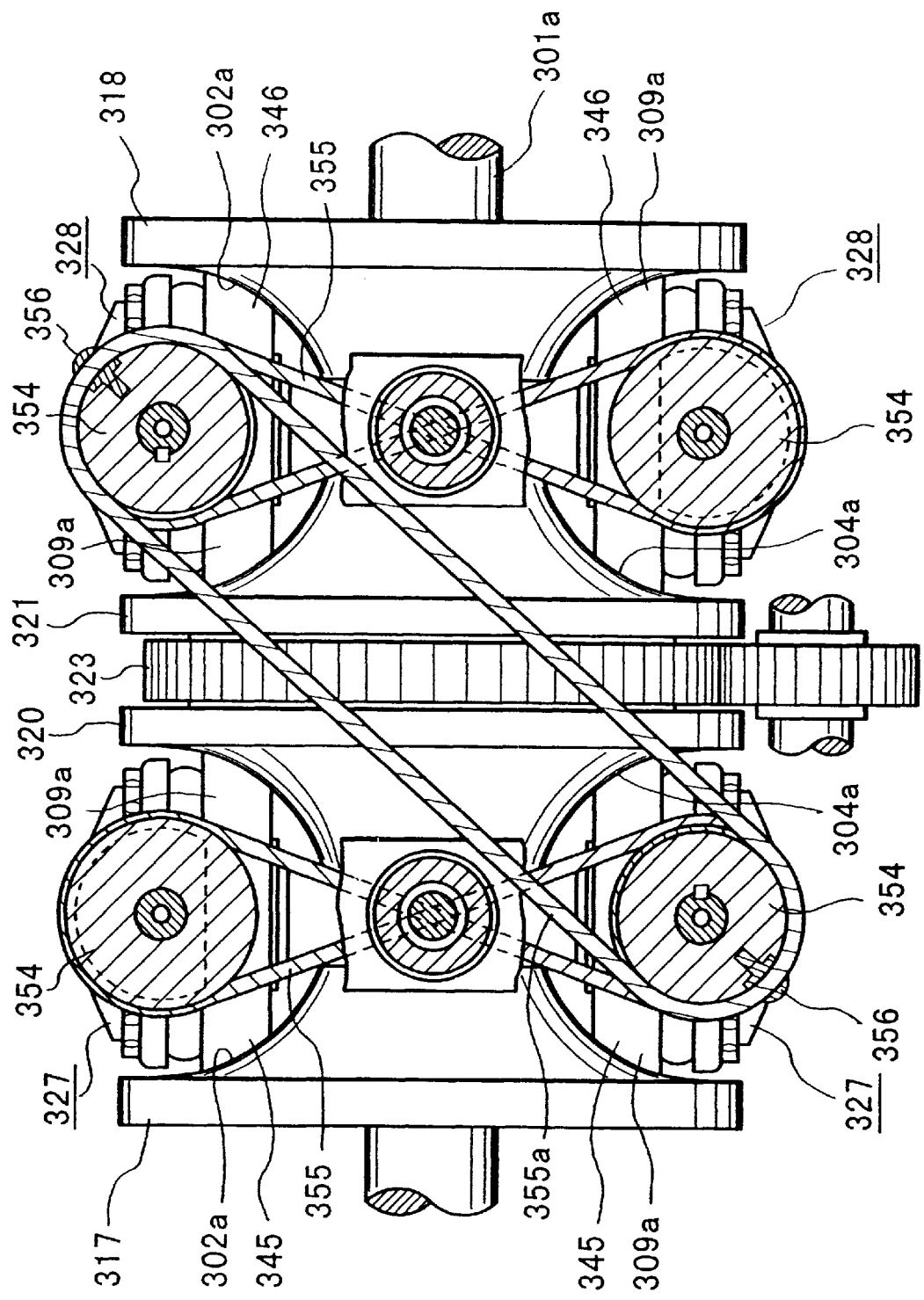
FIG. 29 is a sectional view showing a first example of a conventional synchronizing mechanism using a cable.
Figure 30:
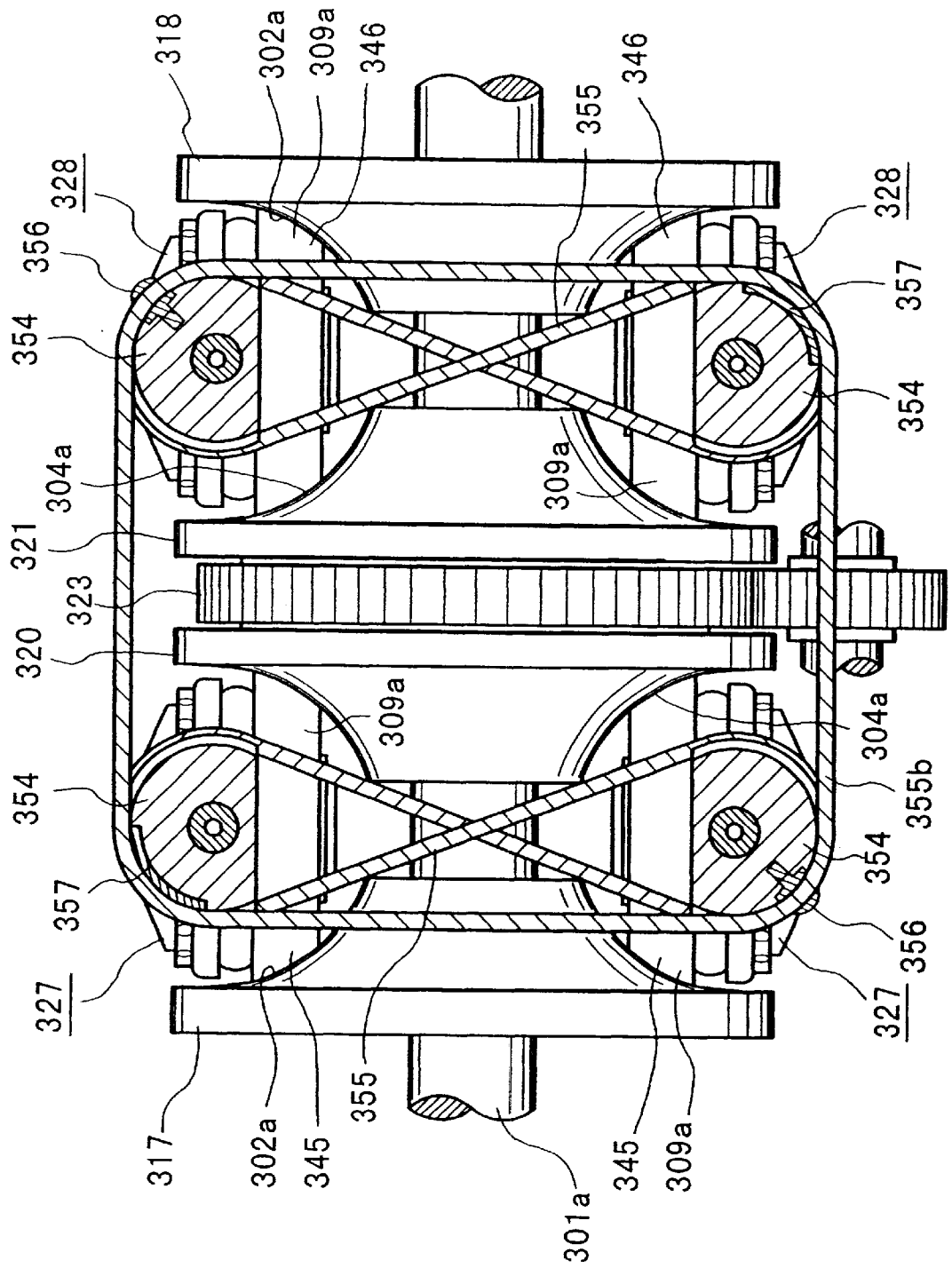
FIG. 30 is a sectional view showing a second example of a conventional synchronizing mechanism using a cable.

Incidentally, when the present invention is carried out, a mechanism for coinciding the inclination angles of the trunnions with each other is not limited to the gear transmitting mechanisms 282, 71, 156, but, a mechanism using a cable as shown in FIGS. 29 and 30 may be used.

Now, a conventional synchronizing mechanism using a cable will be described with reference to FIGS. 29 and 30.

That is to say, such mechanism are well-known as disclosed in Japanese Patent Laid-Open Nos. 63-67458 (1988) and 4-327051 (1992) and Japanese Utility Model Laid-Open No. 62-200852 (1987). Among them, FIGS. 29 and 30 show two examples disclosed in the Japanese Patent Laid-Open No. 4-327051. On the basis of FIGS. 29 and 30, a mechanism for synchronizing the rocking movements of the first and second trunnions 227, 228 in the toroidal type continuously variable transmission of double cavity type with each other will now be explained.

In order to construct the synchronizing mechanism, pulleys 354 are secured to the axial (direction perpendicular to the planes of FIGS. 29 and 30) ends of the first and second trunnions 227, 228. Peripheral surfaces of the pulleys 354 are formed as arc surfaces coaxial with the pivot shafts 329, 330 (refer to reference numerals 29, 30 in FIGS. 27 and 28). Portions of cable 355, 355a, 355b are fitted into and wound around grooves formed in the peripheral surfaces of the pulleys 354 so that four (in total) first and second trunnions 227, 228 are rocking in a synchronous manner. That is to say, in any arrangements, each cable 355 is extends between the wound around the pair of pulleys 354 secured to the ends of the of first and second trunnions 227, 228 constituting each pair in a cross belting fashion. Accordingly, the pair of first and second trunnions 227, 228 (located within the same cavity) can be rotated in opposite direction by the same angle, and the pulleys 354 arranged along a diagonal line (located within different cavities and situated at diametrically opposed position with respect to the input shaft 301a) can be rotated in the same direction by the same amount.

To this end, in the arrangement according to the first example shown in FIG. 29, the cable 355a is mounted only between the pulleys 354 arranged along the diagonal line, and the cable 355a is secured to the pulleys 354 arranged along the diagonal line by fasteners 356. On the other hand, in the arrangement according to the second example shown in FIG. 30, the cable 355b are wound around all of the pulleys 354, and the cable 355b is secured to only the pair of pulleys 354 arranged along the diagonal line by fasteners 356. Any slip can be generated between the remaining pulleys 354 and the cable 355b so that the movement of the cable 355b is not transmitted to the remaining pulleys 354. The arrangement shown in FIG. 30 is adopted in order to prevent interference between the cable 355b and other members constituting the toroidal type continuously variable transmission such as first and second output discs 320, 321 and large diameter output gear 323. Incidentally, also in the toroidal type continuously variable transmission of so-called single cavity type in which a single input disc and a single output disc are provided, by providing the cable 355 of cross belting type shown in FIGS. 29 and 30, the rocking movements of the plurality of trunnions are synchronized with each other. Further, although not shown, Japanese Utility Model Publication No. 4-52512 (1992) and Japanese Patent Laid-Open Nos. 6-117515 (1994) and 7-243496 (1995) disclose techniques in which a mechanism for synchronizing inclination angles of a plurality of trunnions with each other is constituted by a gear transmitting mechanism.

Many widely different embodiments of the present invention may be constructed without departing from the spirit and scope of the present invention. It should be understood that the present invention is not limited to the specific embodiments described in the specification, except as defined in the appended claims.

What is claimed is:

1. A toroidal type continuously variable transmission comprising:

a casing;

input and output discs supported within said casing coaxially with each other and capable of being rotated independently;

an even number of pivot shafts disposed coaxially with or parallel with each other between said discs at twisted positions where said pivot shafts do not intersect with a central axis of said discs but extend toward directions perpendicular to said central axis;

a plurality of trunnions rockable around said pivot shafts;

displacement shafts protruded from inner surfaces of said trunnions;

a plurality of power rollers rotatably supported around said displacement shafts and interposed between inner surfaces of said input and output discs; and support structure provided at sides of said power rollers and adapted to support said pivot shafts for rocking displacement and axial displacement;

and wherein yokes forming a part of said support structure and having ends for supporting said pivot shafts provided on the ends of said plurality of trunnions are directly supported by and secured to an inner surface of said casing, and, said pivot shafts can be displaced axially, by splines, with respect to the ends of said yokes, and needle bearings for rockably supporting said pivot shafts are provided within the inside of said splines.

2. A transmission according to claim 1, wherein said splines are ball splines, and outer peripheral surfaces of outer races of said ball splines are formed as semi-spherical convex surfaces, and the convex surfaces are rockably received in circular holes formed in said yokes.

3. A transmission according to claim 2, wherein a gear transmitting mechanism is provided between said plurality of trunnions to synchronize inclination movements of said trunnions.

4. A transmission according to claim 3, wherein said gear transmitting mechanism is a rack-and-pinion mechanism.

5. A transmission according to claim 1, wherein a gear transmitting mechanism is provided between said plurality of trunnions to synchronize inclination movements of said trunnions.

6. A transmission according to claim 1, the input and output discs being of half-toroidal construction.

7. A toroidal type continuously variable transmission comprising:

a casing;

first and second outer discs supported within said casing coaxially with each other and capable of being rotated synchronously in a condition that inner surfaces of said discs are opposed to each other;

a first inner disc supported coaxially with said first and second outer discs and capable of being rotated independently from said first and second outer discs and having an inner surface opposed to the inner surface of said first outer disc;

a second inner disc supported coaxially with said first inner disc and capable of being rotated synchronously with said first inner disc and having an inner surface opposed to the inner surface of said second outer disc;

four first pivot shafts disposed coaxially with or parallel with each other between said fist outer disc and said first inner disc at twisted positions where said pivot shafts do not intersect with a central axis of said discs but extend toward directions perpendicular to the central axis;

a pair of first trunnions rockable around said first pivot shafts;

first displacement shafts protruded from inner surfaces of said first trunnions;

a pair of first power rollers rotatably supported around said first displacement shafts and interposed between the inner surface of said first outer disc and the inner surface of said first inner disc;

four second pivot shafts disposed coaxially with or parallel with each other between said second outer disc and said second inner disc at twisted positions where said pivot shafts do not intersect with a central axis of said discs but extend toward directions perpendicular to the central axis;

a pair of second trunnions rockable around said second pivot shafts;

second displacement shafts protruded from inner surfaces of said second trunnions;

a pair of second power rollers rotatably supported around said second displacement shafts and interposed between the inner surface of said second outer disc and the inner surface of said second inner disc; and first and second support structures provided substantially in parallel with each other at sides of said first and second inner discs with the interposition of said first and second inner discs in such a manner that one ends are disposed between said first outer disc and said first inner disc and the other ends are disposed between said second outer disc and said second inner disc;

and wherein
said first support structure supports two of said four first pivot shafts and two of said four second pivot shafts for rocking movement and axial displacement, and said second support structure supports the other two of said four first pivot shafts and the other two of said four second pivot shafts for rocking movement and axial displacement;

and further wherein
yokes constituting said first and second support structures and having four corners for supporting said pivot shafts provided on the ends of said plurality of trunnions are directly supported by and secured to an inner surface of said casing, and said pivot shafts can be displaced axially, by splines, with respect to said four corners of said yokes, and needle bearings for rockably supporting said pivot shafts are provided within the inside of said splines.

8. A transmission according to claim 7, wherein said splines are ball splines, and outer peripheral surfaces of outer races of said ball splines are formed as semi-spherical convex surfaces, and the convex surfaces are rockably received in circular holes formed in said yokes.

9. A transmission according to claim 7, wherein a gear transmitting mechanism is provided between said plurality of trunnions to synchronize inclination movements of said trunnions.

10. A transmission according to claim 7, the input and output discs being of half-toroidal construction.

* * * * *